(12) United States Patent
Birch et al.

(10) Patent No.: US 11,734,734 B2
(45) Date of Patent: Aug. 22, 2023

(54) SYSTEM AND METHOD FOR WEB SERVICE BILLING

(71) Applicant: Netcracker Technology Solutions Inc., Cincinnati, OH (US)

(72) Inventors: Robert Birch, Orlando, FL (US); Scott Irwin, Winter Springs, FL (US); Joseph Lupo, Apopka, FL (US); Steve Weagraff, Orlando, FL (US)

(73) Assignee: NETCRACKER TECHNOLOGY SOLUTIONS INC., Cincinnati, OH (US)

( * ) Notice: Subject to any disclaimer, the term of this patent is extended or adjusted under 35 U.S.C. 154(b) by 0 days.

(21) Appl. No.: 15/650,330

(22) Filed: Jul. 14, 2017

(65) Prior Publication Data

US 2018/0158117 A1  Jun. 7, 2018

Related U.S. Application Data

(63) Continuation of application No. 10/666,631, filed on Sep. 18, 2003, now abandoned.

(51) Int. Cl.
*G06Q 30/04* (2012.01)
*G06Q 20/10* (2012.01)

(52) U.S. Cl.
CPC ........... *G06Q 30/04* (2013.01); *G06Q 20/102* (2013.01)

(58) Field of Classification Search
CPC ........ G06Q 40/00; G06Q 40/02; G06Q 20/10; G06Q 20/102; G06Q 20/40; G06Q 30/04; G06Q 30/06

USPC ..................................................... 705/39–42
See application file for complete search history.

(56) References Cited

U.S. PATENT DOCUMENTS

| | | |
|---|---|---|
| 4,975,942 A | 12/1990 | Zebryk |
| 5,530,852 A | 6/1996 | Meske et al. |
| 5,544,322 A | 8/1996 | Cheng et al. |
| 5,560,008 A | 9/1996 | Johnson et al. |
| 5,768,521 A | 6/1998 | Dedrick |
| 5,819,285 A | 10/1998 | Damico et al. |
| 6,128,607 A | 10/2000 | Nordin et al. |
| 6,230,203 B1 | 5/2001 | Koperda et al. |
| 6,381,632 B1 | 4/2002 | Lowell |
| 6,400,773 B1* | 6/2002 | Krongold ............ H04L 27/2608 370/484 |
| 6,505,201 B1 | 1/2003 | Haitsuka et al. |

(Continued)

FOREIGN PATENT DOCUMENTS

| | | |
|---|---|---|
| WO | WO-01/86570 A1 | 11/2001 |
| WO | WO-02/059754 A1 | 8/2002 |

(Continued)

OTHER PUBLICATIONS

Axis Beta 1 documentation, 2002.

(Continued)

*Primary Examiner* — Hani M Kazimi
(74) *Attorney, Agent, or Firm* — Foley & Lardner LLP

(57) ABSTRACT

A method and system is disclosed herein for decoupling billing for web services from the application logic which governs those web services by instrumenting a web services stack to monitor SOAP envelopes for pre-determined elements and to use those elements to determine questions as to authorization for solvency as well as calculate charges for said web services.

20 Claims, 24 Drawing Sheets

(56) References Cited

U.S. PATENT DOCUMENTS

| | | | |
|---|---|---|---|
| 6,546,375 B1 * | 4/2003 | Pang | G06Q 40/04 705/37 |
| 6,578,015 B1 * | 6/2003 | Haseltine | G06Q 20/102 705/34 |
| 6,639,975 B1 * | 10/2003 | O'Neal | G06Q 20/14 379/112.01 |
| 6,640,097 B2 * | 10/2003 | Corrigan | H04L 12/14 370/404 |
| 6,792,460 B2 * | 9/2004 | Oulu | G06F 11/3495 709/224 |
| 7,080,035 B1 * | 7/2006 | Williams | G06Q 20/102 705/35 |
| 7,124,302 B2 * | 10/2006 | Ginter | G06F 21/10 713/189 |
| 8,024,406 B1 | 9/2011 | Irwin et al. | |
| 2002/0016843 A1 | 2/2002 | Schweitzer et al. | |
| 2002/0089958 A1 * | 7/2002 | Feder | H04L 12/4633 370/338 |
| 2002/0112048 A1 | 8/2002 | Gruyer et al. | |
| 2002/0143819 A1 * | 10/2002 | Han | G06F 17/3089 715/237 |
| 2002/0161676 A1 * | 10/2002 | Vadlamani | G06Q 20/342 705/30 |
| 2002/0174340 A1 | 11/2002 | Dick et al. | |
| 2002/0176378 A1 | 11/2002 | Hamilton et al. | |
| 2002/0178254 A1 | 11/2002 | Brittenham et al. | |
| 2003/0014733 A1 | 1/2003 | Ringseth et al. | |
| 2003/0061067 A1 | 3/2003 | Atwal et al. | |
| 2003/0061404 A1 | 3/2003 | Atwal et al. | |
| 2003/0191701 A1 | 10/2003 | Haseltine et al. | |
| 2004/0006608 A1 | 1/2004 | Swarna et al. | |
| 2004/0138970 A1 | 7/2004 | Ramachandran et al. | |
| 2005/0044197 A1 * | 2/2005 | Lai | G06Q 10/10 709/223 |
| 2005/0216421 A1 * | 9/2005 | Barry | G06F 11/0709 705/64 |
| 2006/0107071 A1 | 5/2006 | Girish et al. | |
| 2007/0028120 A1 | 2/2007 | Wysocki et al. | |
| 2007/0035917 A1 | 2/2007 | Hotelling et al. | |

FOREIGN PATENT DOCUMENTS

| | | |
|---|---|---|
| WO | WO-02/082305 A1 | 10/2002 |
| WO | WO-02/096012 A1 | 11/2002 |
| WO | WO-02/096105 A1 | 11/2002 |

OTHER PUBLICATIONS

Graham, S. et al., "Building Web Services with Java: Making Sense of XML, SOAP, WSDL andUDDI", Sams Indianapolis, Indiana, 2002.

IBM and Microsoft, Web Services Framework for W3C Workshop on Web Services, Apr. 11-12, 2001, San Jose CA, http://www.w3.org/2001/03/WSWS-popa/paper51, published Jun. 10, 2002.

IBM Web services provisioning for Websphere; Web Services Hosting Technology Version 1.1, "White Paper: Overview and Introduction", 2002.

IBM Web services provisioning; 8 pgs., http://www-0106.ibm.com/developerworks/webservices/library/ws-wsht/ published Apr. 14, 2003.

Irani, Romin. et al. "Axis, Next Generation Java SOAP", May 2002, Wrox Press, Birmingham, UK.

J2EE 1.4 Enterprise Edition Specification Proposed Final draft, Aug. 19, 2002, http://java.sun.com/i2ee/download.html#platformspec, published Aug. 30, 2002.

JSR-101, Java API for SML base RPC 1.0, JAX-RPC?, http://java.sun.com/webservices/docs.html, published Aug. 30, 2002.

JSR-109, Web Services for J2EE, Version 1.0 proposed final draft: Aug. 19, 2002, http://jcp.org/aboutJava/communityprocess/first/jsr109/index.html, published Aug. 30, 2002.

Network Data Management—Usage for IP services, published Apr. 15, 2002.

Office Action dated Apr. 14, 2009 in related U.S. Appl. No. 10/666,631.

Office Action dated Feb. 12, 2015 in related U.S. Appl. No. 10/666,631.

Office Action dated Jan. 25, 2013 in related U.S. Appl. No. 10/666,631.

Office Action dated Jan. 26, 2007 in related U.S. Appl. No. 10/190,728.

Office Action dated Jan. 6, 2016 in related U.S. Appl. No. 10/666,631.

Office Action dated Jul. 21, 2008 in related U.S. Appl. No. 10/724,955.

Office Action dated Jul. 26, 2007 in related U.S. Appl. No. 10/666,631.

Office Action dated Jun. 16, 2016 in related U.S. Appl. No. 10/666,631.

Office Action dated Jun. 19, 2013 in related U.S. Appl. No. 10/666,631.

Office Action dated Jun. 6, 2014 in related U.S. Appl. No. 10/666,631.

Office Action dated Mar. 10, 2010 in related U.S. Appl. No. 10/666,631.

Office Action dated Mar. 17, 2008 in related U.S. Appl. No. 10/190,728.

Office Action dated Mar. 31, 2011 in related U.S. Appl. No. 10/666,631.

Office Action dated May 2, 2006 in related U.S. Appl. No. 10/190,728.

Office Action dated Oct. 1, 2009 in related U.S. Appl. No. 10/724,955.

Office Action dated Oct. 21, 2014 in related U.S. Appl. No. 10/666,631.

Office Action dated Oct. 3, 2005 in related U.S. Appl. No. 10/190,728.

Office Action dated Sep. 22, 2009 in related U.S. Appl. No. 10/666,631.

Office Action dated Sep. 27, 2010 in related U.S. Appl. No. 10/666,631.

Office Action dated Sep. 7, 2007 in related U.S. Appl. No. 10/190,728.

SOAP 1.1, May 2000, http://www.w3.org/TR/SOAP, published Aug. 30, 2002.

The Stencil Group: Defining Web Services, Jun. 2001, 7 pgs., http://www.perfectxml.com/Xanalysis/TSG/TSG DefiningWebService.pdf.

W3C SOAP Version 1.2 Part 1: Message Framework, Working Draft, http://www.w3.org/TR/2002/WD-soap12-part1-20020626, published Jun. 26, 2002.

* cited by examiner

SYSTEM AND METHOD FOR WEB SERVICE BILLING

PRIORITY

This application is a continuation of U.S. application Ser. No. 10/666,631, filed Sep. 18, 2003; the contents of which are hereby incorporated by reference in their entirety.

BACKGROUND OF THE INVENTION

Field of the Invention

The field of invention relates generally to a computerized architecture for capturing usage details for web services and authorizing those same services using the web stack.

Description of the Related Art

A Web service is a type of loosely coupled distributed application service (usually including some combination of programming and data, but possibly including human resources as well) that enables a business to expose remote software functionality using a Service Oriented Architecture (SOA), that is based upon web service standards. Service Oriented Architectures provide an infrastructure that allows for the advertisement, use and management of distributed software services. Some definitions of common terms in this industry follow.

Definitions

Common Internet Protocols. Although not specifically tied to any transport protocol, web services build on ubiquitous Internet connectivity and infrastructure to ensure nearly universal reach and support. In particular, web services will take advantage of HTTP, the same connection protocol used by web servers and browsers.

Extensible Markup Language (XML). XML is a widely accepted format for exchanging data and its corresponding semantics. It is a fundamental building block for nearly every other layer in the web services stack.

Simple Object Access Protocol (SOAP). SOAP is a protocol for messaging and RPC-style communication between applications. It is based on XML and uses common Internet transport protocols like HTTP to carry its data.

Web Services Description Language (WSDL). WSDL is an XML-based description of how to connect to a particular web service. A WSDL description abstracts a particular service's various connection and messaging protocols into a high-level bundle and forms a key element of the UDDI directory's "green pages."

Universal Description, Discovery, and Integration (UDDI). UDDI represents a set of protocols and a public directory for the registration and real-time lookup of web services and other business processes.

Web Services Flow Language (WSFL). WSFL is the least developed of the current web services layers. Sponsored by IBM, the WSFL team hopes to define a framework that implementers of web services can use to describe the business logic required to assemble various services into an end-to-end business process.

Other Business Rules. Additional elements that support complex business rules must still be implemented before web services can automate truly critical business processes. Mechanisms for security and authentication, contract management, quality of service, and more will soon follow—some as standards, others as value-added solutions from independent software vendors.

XML-RPC. XML-RPC represents the simplest form of web service style connections. As the name indicates (XML-RPC means "XML Remote Procedure Call"), the protocol was a loosely defined spin-off from the efforts that ultimately led to the SOAP specification. Although not part of the "classic" web services stack, XML-RPC can be used to achieve similar benefits for less structured connections.

Service Oriented Architecture (SOA)

There may be three main roles in a SOA: provider, broker, and consumer. The Service Provider is the provider and possibly the creator of the service. The Service Broker advertises where the service can be found and supporting information. The Service Consumer may be the end user of the service.

Referring to FIG. 1, generally, a service provider creates the service and publishes the availability of the service in the service broker's registry. Consumers who require a particular service will search the broker's registry for the required service. When the consumer finds and selects the service that satisfies their requirements they can use the information provided by service provider in the UDDI registry to consume the advertised service.

In a Web service SOA a service can be created by the service provider and then advertised into a Web service registry, possibly using a standard registry such as Universal Description Discovery and Integration (UDDI) server. Service consumers will search the UDDI registry for one or more services that will satisfy their service requirements. A service can be used standalone or aggregated with other services to solve the service requirements of the consumer. When Web service(s) are located by the consumer in the UDDI registry the consumer may download from the UDDI a set of supporting material to access the advertised Web Service. In a Web service environment one of the items downloaded by the consumer from the UDDI registry is a Web Service Description Language (WSDL) file. This file contains a description of the Web service interface, network access protocol, and network address of the service. The consumer will typically use the WSDL file and a generation tool that reads the WSDL file to generate a preferred language technology to access the web service.

Web services represent a model in which discrete tasks within e-business processes are distributed widely throughout a value net. Web services components can be recombined by other companies to meet the needs of their own software applications or business processes.

One simple example of a web service may be an auction engine like eBay's. The eBay web site offers a highly successful auction service. Today, however, if Widgets-R-Us, a business that sells surplus widgets, wants to add auction functionality to its own business model, it needs to develop its own auction software from scratch or redirect customers to a site like eBay. With web services, eBay could syndicate its auction functionality and make it available to other web sites or applications (presumably for a fee). Companies like Widgets-R-Us would simply subscribe to eBay's web service, add a few lines of code to their own applications to incorporate the web service, and they instantly have private-labeled auction functionality available on their own sites. Other customer-facing examples include stock quotes, content syndication, mapping services, checking bids for an auction item, and so on. Some more enterprise-centric services may include storage management and customer relationship management, payroll management, shipping and logistics, business intelligence, credit scoring, etc. The accelerating creation and availability of these services is a major Web trend.

Web services are not a specific technology, but rather a group of established and emerging communication protocols that include HTTP, XML, Simple Object Application Protocol (SOAP), Universal Description Discovery and Integration (UDDI), and Web Services Description Language (WSDL). A web service can be developed on any computer platform and in any development environment, as long as it can communicate with other web services using these common protocols.

The Problem

Currently, web services address heterogeneous connectivity, interoperability, service directory, service resolution and rapid application development and deployment; but, web services are significantly void of revenue acquisition opportunities.

It is important to capture web service usage so that quality of service, financial merit, and auditing aspects of the service can be determined by the enterprise. Capturing web service usage is equivalent to metering a web services activity (whether in bytes, dollars, time, number of times accessed, etc.) and the results of metering can be applied to many disciplines including rating, billing, auditing and quality of service. It is desirable to provide a solution for capturing web service usage for existing applications that will not require modification of the underlying service itself. A web services development toolkit would help developers of web services become metering enabled for the services they are offering.

Web Services Stack

"Web Services" is a distributed, loosely coupled, interoperable service architecture driven by a set of standards. To better understand the Web Services architecture the following sections will categorize the components of the architecture into several stacks. Referring to FIG. 3, there are three main stacks: wire (310), service (320) and service (330).

Wire Stack (310)

The wire stack (310) is a set of technologies that determines how a message is sent between the service requestor and the service provider. Referring to FIG. 4, there are 4 layers to the wire stack (310) that are mostly built upon XML, SOAP and other Internet standards.

At the bottom of the stack (310) is the network protocol (410). This is actually defines the transport technology that is used to transfer the data between the service requestor and service provider. Currently the most popular network protocol for Web Services is HTTP, but Web Services is not restricted to HTTP. Other protocols may be supported such as standard Internet protocols like FTP, SMTP and others. In fact just about any network protocol (410) can be used as long as the requestor and provider are able to communicate via the agreed network protocol (410).

Just above the network protocol stack is the data-encoding stack (420), which is used to map data to and from the network protocol format into and from a programming language format suitable for use by programmers. Web Services uses XML Schema to define the data types that are transferred. Also support for custom schemas are supported such as SOAP encoding.

Web Services uses the SOAP standard as the XML messaging format (430). SOAP provides a standard message envelope for holding message header and body information. Also SOAP defines a standard set of messaging exchange protocols (MEP's, client server communication interactions). SOAP also defines a standard mechanism for defining network protocol bindings. Network protocol bindings define which type of transport will be used.

At the top of the stack are the SOAP envelope extensions (440). These allow for the use orthogonal extensions to the SOAP message. Header extensions may be used for message security (authentication, authorization, digital signatures, etc), transactions, routing and other orthogonal entities.

There is a set of core services that drive through all layers of the wire stack and possibly extend beyond the wire stack. These can be considered vertical stack technologies. These may be security, manageability and Quality of Service services. For example security could appear at several levels of the stack.

| | Security in the Wire Stack | | | |
|---|---|---|---|---|
| Wire Stack | Envelope | XML Messaging | Data Encoding | Network Protocol |
| Security | Digital Signatures | Cryptography | | SSL |

Currently the standard details of vertical technologies are just getting started.

The Web Services wire stack is built upon a set of well-supported standards and proven technologies. This stack is the foundation upon which Web Services is built.

Service Description Stack (320)

The wire stack defines the low-level technology details of the service requestor to service provider communications. The service description stack (320) describes the information about a service that may be of most interest to the service requestor. Service description may be key to the three main operations of publish, find and bind in a Service Oriented Architecture. The service description stack defines the service level interaction requirements between the requestor and provider. A service description specifies most of the following service description attributes:

Address of the Web Service

What transport/network protocol may be used (HTTP, FTP, ... )

The version of SOAP used

The data encoding/mapping type

Type of messaging RPC/Document

Message format (Define+why important?)

Service Provider service environment qualities and polices (Define)

Multi-Service coordination (Define)

The five layers of the service description stack (320) can be classified into functional and non-functional layers. The lower layers of the stack may be functional and describe the details of what a Web Service does, how a Web Service may be invoked, where it may be invoked and other functional details. The upper layers of the stack may be non-functional in that they describe the environment and qualities of a provider's Web Service.

Referring to FIG. 5, at the bottom of the stack may be XML (510). Web Services may be driven by XML standards. Functional and non-functional service descriptions may be defined using XML. XML Schema may be used in the service description as an abstract data type definition for service data exchanged.

Just above the XML layer may be the service-implementation (520) and service-interface (530) layers, both of which may be described in the Web Services Definition Language (WSDL) file. Where a service may be located (i.e., its network address of where messages are to be sent so that services can be rendered) may be described in the service implementation layer. The service interface layer describes what message needs to be sent and what messaging transport may be used to access the service and how the data is to be encoded or mapped into the SOAP envelope.

Endpoint descriptions (540) are just starting to be discussed as a possible mechanism for describing environmental characteristics of an offered service. These characteristics might describe attributes of a Web-Service hosting environment such as security policies, timeliness of response, cost of service and other quality of service criteria. Currently in the Web Service Flow Language specification from IBM there is a suggestion of the use of a Web Service End-Point Language (WSEL) used to describe the quality attributes of an end-point. Currently there is no W3C or IETF end-point specifications as of this time only that some vendors have started some to do some work in this area.

At the top of the service description stack (550) may be the ability to describe how a set of Web Services may be orchestrated to work together to provide complex services such as multi-party, multi-operation long running transactions. Currently, there is no standard for the orchestration of Web Services, but IBM has a proposal call Web Services Flow Language (WSFL) and Microsoft has XLANG that is part of their .NET initiative and there is Business Process Markup, sponsored by the Business Process Management Initiative (BPMI). Which one or more of these will become a standard is yet to be determined.

Service Discovery Stack (330)

Referring to FIG. 6, service discovery (330) provides the ability for service provider to advertise their services and service requestors to find advertised services they may be interested in using. Service requestors need a directory (620) in order to search for Web Services. Currently the most widely used directories (620) for web services may be either a Universal Description, Discovery and Integration (UDDI) directory (620) or an ebXML registry (620). Service providers advertise their service in directories by registering textual descriptions and categorization of their services in the registry. They also make the service description (WSDL) available from the registry. Service requestors use the registry to find services and obtain the service descriptions (WSDL file) so that they can bind to the service provider's service.

The inspection layer (610) provides a list of discovery mechanisms that a particular service can be found. For example it may be possible for service descriptions to be obtained by asking the service provider directly for the WSDL. This is not a standard directory but this is another mechanism for locating a service definition. So an inspection service (610) provides a list of locations where a service description can be obtained.

SUMMARY

Referring to FIG. 25, this diagram illustrates one embodiment of the invention as a whole system.

The SOAP message may be passed to the handler (WebServiceEventParser). Based on information from the Web Service usage acquisition and bill authorization deployment descriptor, the WebServiceEventParser determines whether the service may be metered and/or authorized. If the SOAP message is not to be metered or authorized then the SOAP message may continue through the SOAP stack without any further interruption from WSUAF. If it is to be metered or authorized, the SOAP message may then be parsed by a handler/parser and the results of the parse may be handed off to an event composer that composes the event. After the completion of the parsing and the composition of the event, the event may be either sent to an authorization system to be authorized or enqueued into the usage event system queue where it may be picked up by the system distributor that publishes the event to subscribed transmitters. The transmitters serialize the event and send it via a web service, to the Usage Mediation service where the event will be rated billed and settled.

In one embodiment, there may be a computerized method for billing for web services comprising the steps of creating a descriptor file designating at least one pre-defined element (any aspect of the web service including quality of service, type of service, length of service, location of requestor, location of server, authorization key fields, version numbers, encrypted account information, and start/stop time, and more); configuring a handler (known in the art) to monitor a web service network communication (message stream, i.e., SOAP envelope), between a service requestor (user requesting a service via their computer) and a service provider (provider of the web service), for said pre-defined element(s) in said descriptor file; configuring said handler to send said pre-defined element(s) to a set of programmed instructions to create an event record (i.e., WebServiceEventParser); electronically transmitting said event record to a billing system for further processing (i.e., authorization or rating). The computerized method may comprise programmed instructions (modules, programs, firmware, hardware, software) which determines whether or not the event requires authorization or rating based on the parameters pulled from the SOAP envelope or otherwise from the message stream. The various pre-defined fields may be used to support a variety of billing plans.

The deployment descriptor may also contain instructions for modifying or transforming the data comprising the pre-defined data elements before the event is sent to the billing system. This may include masking, manipulating, calculations, formatting, and more.

The communication for a web service may be a duplex communication between the client and the server. It may comprise a request and a response wherein said request comprises a start time and said response comprises an end time. Using the parameters, rating of the web service may be accomplished by creating a first event record comprising said start time; sending said first event record to said billing system; queuing said first event record in said billing system; creating a second event record comprising said end time; sending said second event record to said billing system; matching said first event record with said second event record; calculating a charge for said web service based on said start time and said end time; returning said charge to said service provider.

The billing system may comprise programmed billing instructions which determine whether a web service transaction may be performed including whether the service requestor is permitted to access said web service transaction or whether the service requestor is solvent enough to purchase the web service. The billing system may return a response to the web service provider indicating whether the transaction may continue or not.

In another embodiment, there may be a computer-readable medium having computer executable instructions for performing a method comprising receiving a descriptor file designating at least one pre-defined element; utilizing said descriptor file to monitor a web service network communication for said pre-defined element(s); copying said predefined element(s) from said network communication into a record; electronically sending said record to a billing system for further processing.

In another embodiment, there may be a system for billing for web services comprising a descriptor file; a handler; a record; and a billing system. These elements may work in cooperation wherein said descriptor file designates at least one pre-defined elements; said handler is configured to monitor a web service network communication, between a service requestor and a service provider, for said at least one pre-defined element in said descriptor file; said handler is further configured to copy said pre-defined elements from said network communication into a record; said handler is further configured to electronically transmit said record to a billing system for further processing.

DETAILED DESCRIPTION OF SEVERAL EMBODIMENTS OF THE INVENTION

Various embodiments of the invention comprise a web service development and deployment toolkit that will enable providers to instrument their web services to acquire usage and perform billing authorization. The toolkit includes the Web Service Usage Acquisition and Authorization Framework (WSUAF), which further includes a runtime engine that performs three core functions:
 1. Extract usage and billing authorization data from the web service message stream (capture).
 2. Forward the captured web service usage to one or more collectors (collect).
 3. Request billing authorization from a backend authorization service for use of a billable web service.

Figure 1:
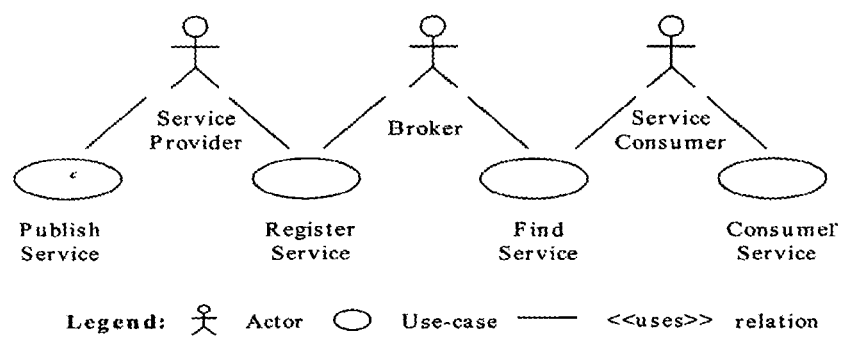
FIG. 1 The main participants in one embodiment of a Service Oriented Architecture.
Figure 2:
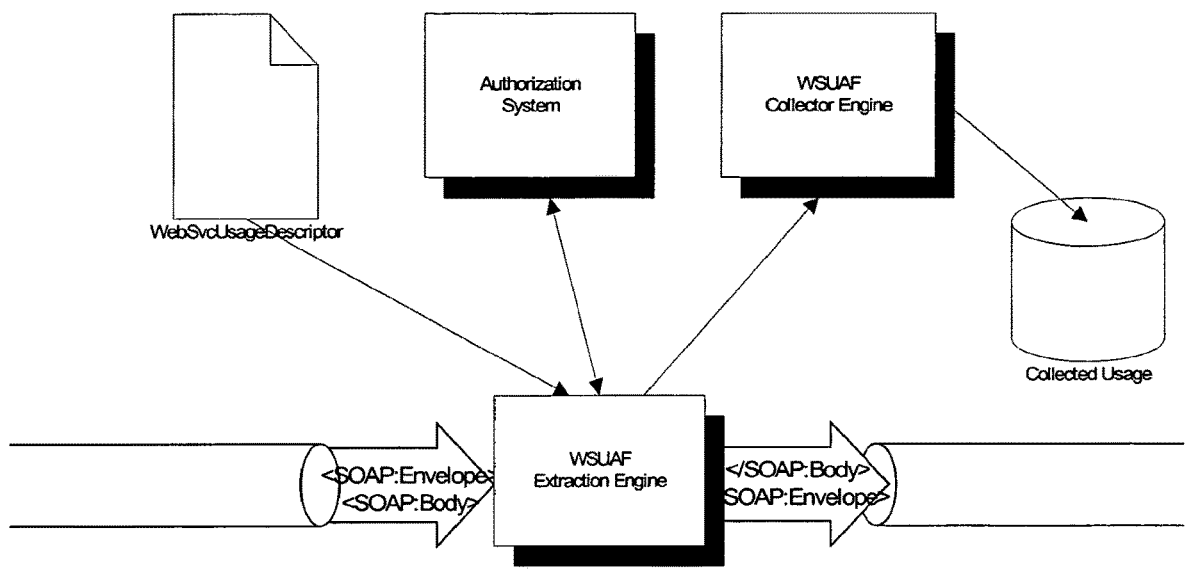
FIG. 2 High Level Architecture Overview of one embodiment of WSUAF.
Figure 3:
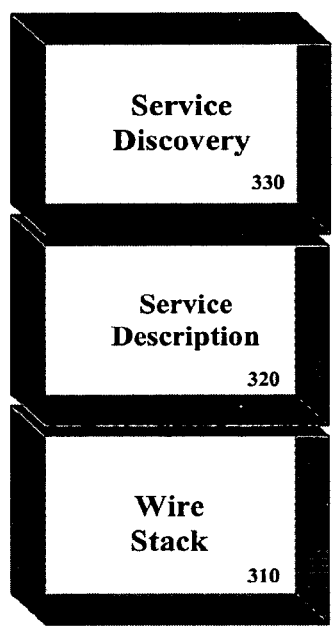
FIG. 3—Three stacks of Web Services.
Figure 4:
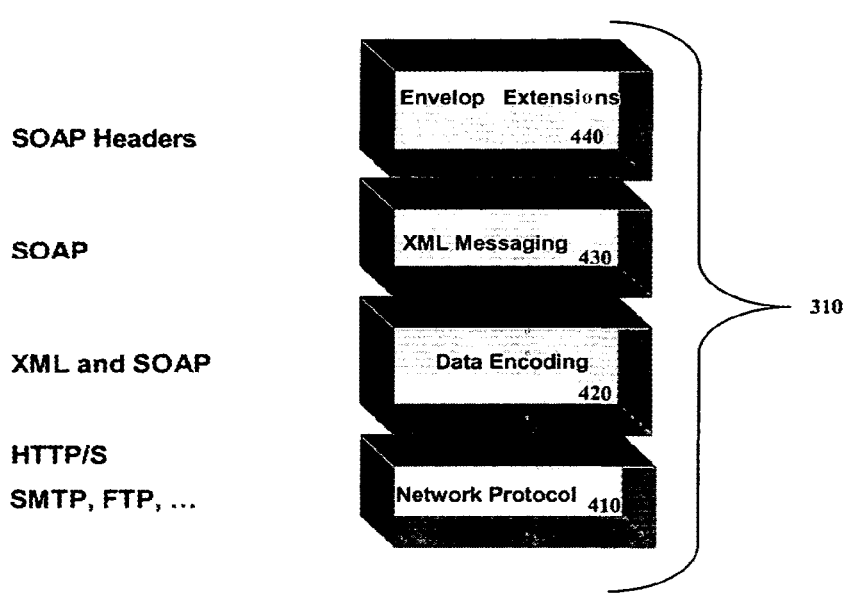
FIG. 4 Wire Stack.
Figure 5:
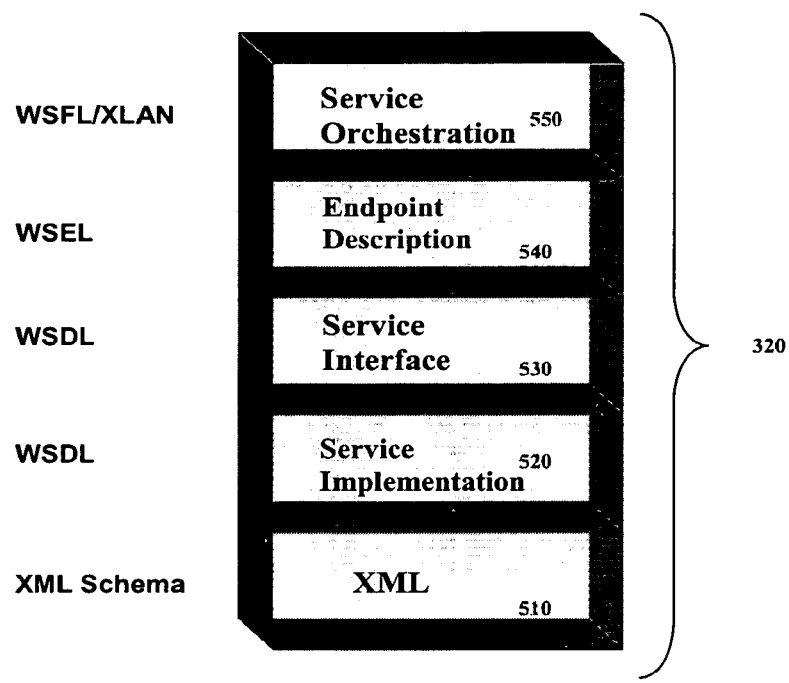
FIG. 5 Service Description Stack.

Referring to FIG. 2, WSUAF extracts service usage or billing authorization information from web service messages that may be encoded into a standard SOAP message envelope. The extraction of usage or billing authorization information from the SOAP envelope can occur anywhere along the communication path where there may be a web services SOAP stack or where the SOAP envelope may be accessible. The WSUAF may examine SOAP messages directly from the network pipe or stack. Capturing usage or billing authorization information can occur at the web service client that may be utilizing the service or at the web service server where the service is being offered or possibly at both locations. Usage and billing authorization information extraction from SOAP messages could also occur somewhere in between such as at a network router. This usage capture may be accomplished by instrumentation of the Web services stack. When the WSUAF identifies a service where usage and/or billing authorization may be done, the WSUAF copies the elements from the SOAP message into a usage record or in the case of a monetary authorization a billing authorization request event may be created. In order to extract usage or billing authorization information from a web service the WSUAF extraction engine utilizes a web service usage/billing authorization deployment/descriptor file. Within the web service usage/billing authorization deployment/descriptor file may be a list of services and the elements from those service that may be captured and whether or not a usage event and/or billing authorization should occur. Elements may be copied from the SOAP message stream and into a usage record and/or a billing authorization request. The copied elements may be transformed as specified by the deployment descriptor file prior to being placed into a usage record or billing authorization request. Also, when a usage record or billing authorization may be constructed, extra fields such as constants as specified in the web service descriptor file can be added to the usage record or billing authorization request. Once the usage record may be completely composed, it may be passed onto the WSUAF collector engine where usage records may be pooled and managed. When the construction of a billing authorization request event may be completed the request may be sent to a billing authorization system to request authorization of a billable web service. A response may be sent back from the billing authorization system indicating whether the user of the billable web service can pay for use of the service, if the user can pay the web service follows through to completion. If the user cannot pay then the request for the web service may be logged and the service may be terminated with an error indication returned to the web service user.

Benefits

Use of the instrumented web services stack allows for the acquisition of billing information to be decoupled from the application code. Use of the instrumented stack may also require no development from the service provider. The provider may simply add the configuration information into the WSUAF Web Service deployment descriptor. This will be advantageous for organizations that have existing deployed web services that are not currently metered and wish to meter them and/or add billing authorization to them. If the dynamic deployment and configuration are insufficient to acquire the necessary service usage information, the WSUAF may also provide event composers, which can be extended and then deployed into the instrumented stack.

The WSUAF model discussed provides many benefits including more efficient development, manageability, flexibility, and access to data not privy to the application.

By placing the billing functionality, such as the capture of web service usage information and the bill authorization of web services, within the Web service SOAP stack there may be no requirement for Web service developers to mix billing functionality with the Web service application functionality. This will reduce the complexity and management of web service development. This can be further complicated if authorization needs to be coordinated in a client server application where the client developer and Web service server developer have to ensure not only application responsibilities but also billing authorization capabilities. Also by means of instrumentation of the SOAP stack existing services that may not be using billing functionality may easily add billing functionality without changing the existing web service application code.

There may be a significant improvement in managing application and billing functionality in development and where the Web services may be deployed. Which services need to have usage capture can be defined at anytime when the web service application may be deployed.

The billing policies a Web service application uses can be determined at anytime once the web service application may be deployed. Policies can be easily changed and deployed.

Through instrumentation of the Web Service stack, the billing functionality may have access to data in the SOAP envelope that is not available to the application code itself. This would include such information as QoS info, authorization key fields, version numbers, encrypted account information, etc. Also the instrumented billing stack will have access to the data necessary to support an innumerable number of billing models such as subscription billing models, bundled plans, time based usage charges (start/stop), re-occurring charges, one time charges, discount plans based on usage, charges and discounts based on time of day, customer loyalty charges and discounts, family plans or organizational relationship plans that determine discounts and charges, stepped and tiered plans, location dependent pricing and authorization.

WSUAF

In a preferred embodiment, a Web Services solution for acquiring Web Service usage and bill authorization information may be used in conjunction with a billing and rating system such as those marketed/serviced by Convergys, Inc. This solution for usage acquisition and billing authorization may also be integrated into systems for customer management and price plan management. The WSUAF may follow and implement security standards such as WS-Security standards and SOAP Security extensions for Digital Signatures.

The WSUAF may support the following standards among others as well as similar and evolutionary standards to be developed in the future: SOAP 1.1 [section 5 RPC-encoding and follow the request & response messaging protocol]; WSDL 1.0; Java 1.3; JAX-RPC 1.0; SAAJ 1.1; Servlet 2.3; JSP 1.2; XML 1.0; XML Schema 1.0. For explanatory purposes only, a web server based reference implementation may be specified that uses the Java based web server Tomcat 4.0.3 from the Apache organization; and the Axis Beta 1 plug-in which web service enables the Tomcat web server is also from the Apache organization; JDK 1.3. This is only a reference implementation and does not represent all possible embodiments.

Use Cases

Figure 7:
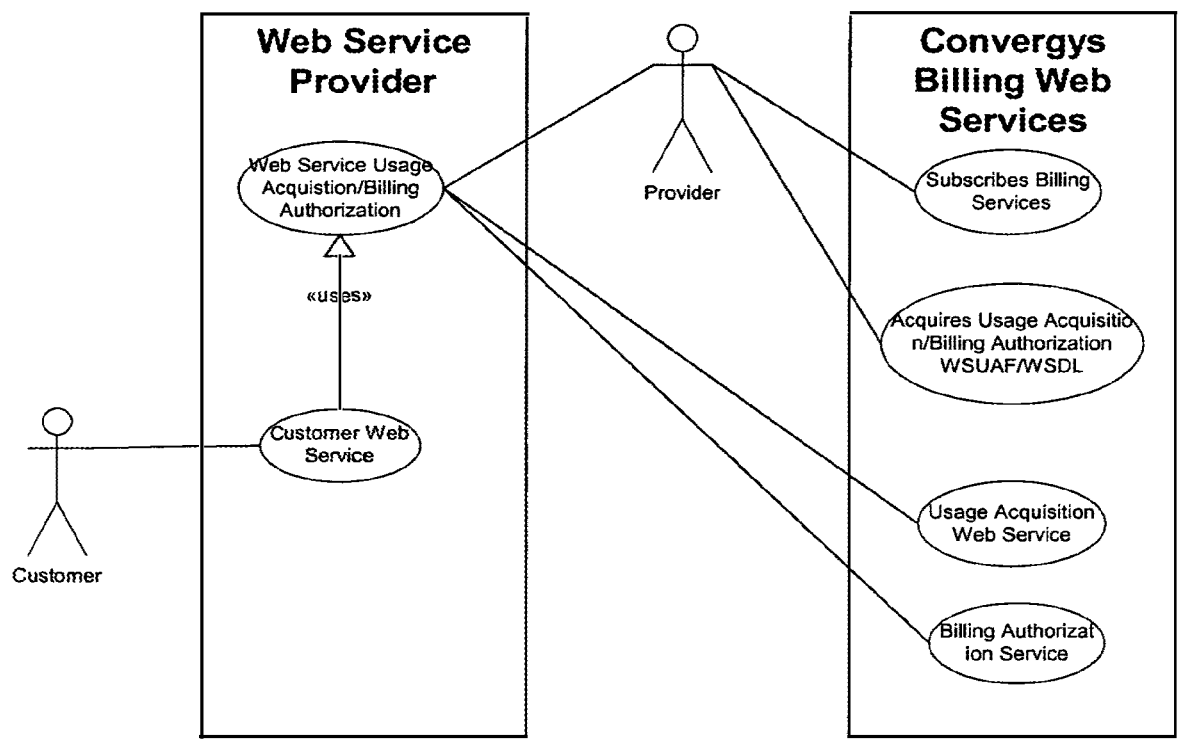
FIG. 7 Use Case Diagram showing how providers may subscribe to a Billing Web Services.

We will discuss two use cases for acquiring web service usage and the billing authorization of a web service. In use case #1 (FIG. 7), Usage Acquisition and Bill Authorization as a Web Service, the web service provider will acquire the web service usage information and bill authorize a web service by a means other than using an instrumented web services stack. Once the usage may be acquired the service provider will send the usage via a Web service to the Real Time Usage Acquisition collection service. When a web service must be bill authorized the service provider will send a bill authorization request via a Bill Authorization web service. In use case #2 (FIG. 8) the service provider may use an instrumented Web service stack to acquire and bill authorize a web service.

Usage Acquisition and Bill Authorization as a Web Service #1

Figure 6:
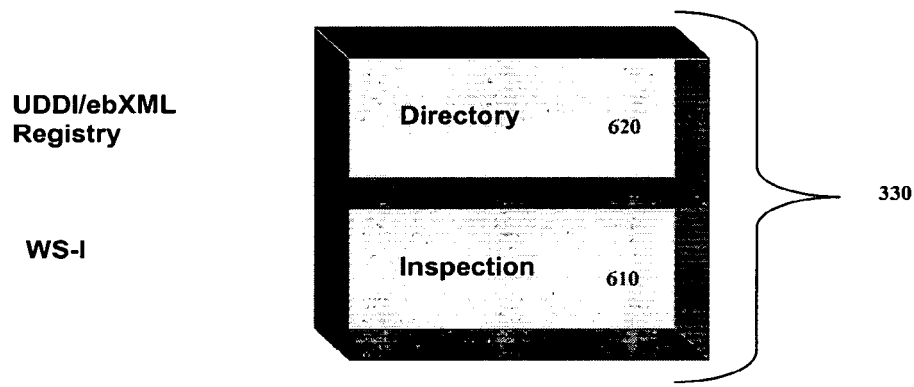
FIG. 6 Service Discovery Stack.

Referring to FIG. 6, various embodiments of the invention utilize the Web Services Description Language (WSDL). The service provider may use WSDL to generate the code necessary to access the Usage Acquisition or Bill Authorization Web Services if they are currently gathering usage and bill authorization information by directly augmenting their application code (thus mixing application code and usage acquisition and bill authorization code), the gathered usage information may be collected, rated and billed using a web service, or the provider may batch the usage and then send the usage to a Batch Usage Acquisition Web Service. Bill authorization information may be gathered directly in the Web Service application code and a bill authorization request may be formulated and sent to a backend billing authorization system, which may offer the authorization service also as a web service. The billing authorization system will use the information sent in the request to determine whether the original requester of the Web Service may be bill authorized to access the service. Or the bill authorization system will return additional information back to the requesting system in order to give it the ability to determine whether the Web Service should be rendered.

Usage Acquisition and Bill Authorization as Part of the Web Services Stack #2

Figure 8:
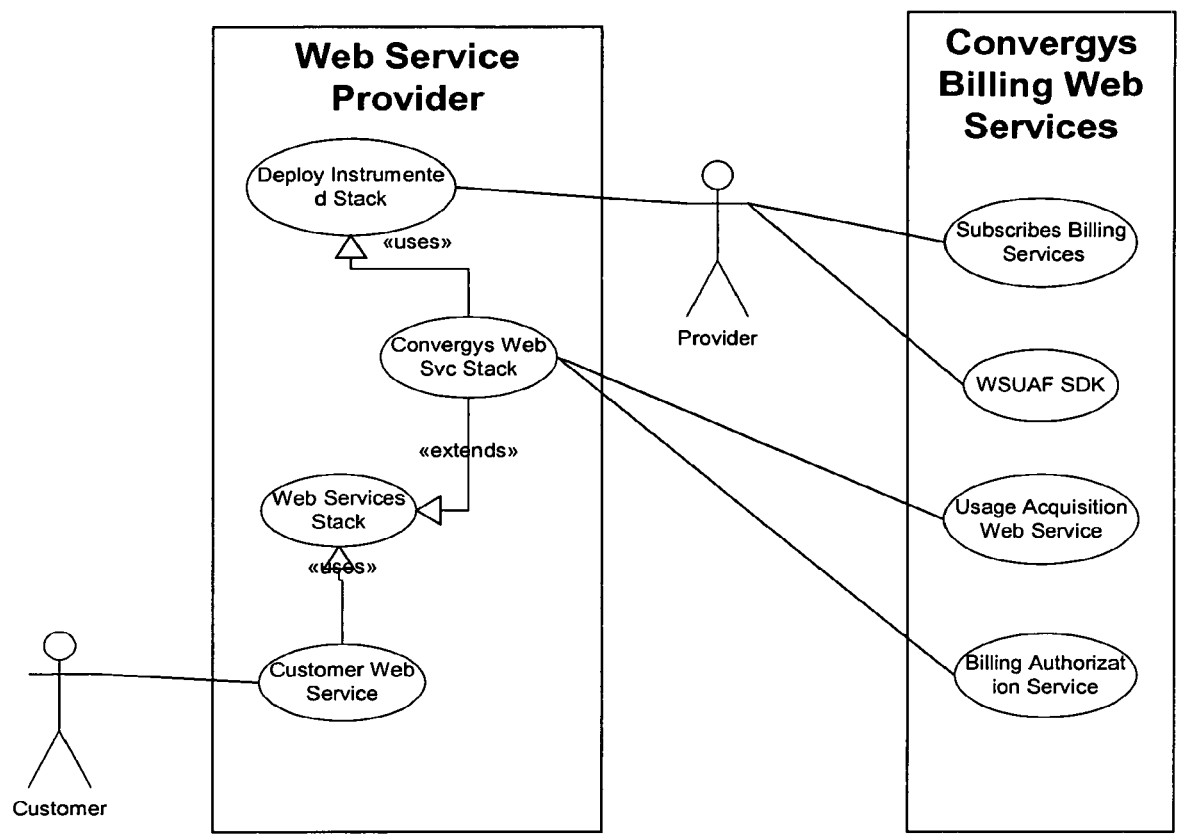
FIG. 8 Use Case Diagram showing how providers acquire the WSUAF and deploy it into their Web Services SOAP stack.

Referring to FIG. 8, usage acquisition and billing authorization may be deployed as part of the web services stack. The WSUAF provides a plug-in that may be used to by the web services SOAP stack to acquire usage and other billing information.

Once the billing plug-in may be installed into the Web service SOAP stack the provider must configure the system using the WSUAF deployment descriptor to capture usage and bill authorize Web Services. In a preferred embodiment, the installation of the Web service SOAP stack should not require the modification of the actual web services in order to acquire usage and perform bill authorization on new or existing web services.

Design Overview

In an embodiment, the WSUAF provides the tools to instrument the web service stack, a WSUAF Web Service deployment descriptor to define the web service usage information to capture and define which Web Services may be bill authorized. The toolkit may provide both a pure web services solution that utilizes WSDL while, at the same time, providing a non-intrusive solution utilizing the web services stack.

WSUAF may also offer the ability to instrument the stack of any JAX-RPC compliant solution. JAX-RPC (Java API for XML-Based RPC) is an application program interface (API) in the Java Web Services Developer Pack (WSDP) that enables Java developers to include remote procedure calls (RPCs) with Web services or other Web-based applications. JAX-RPC is aimed at making it easier for applications or Web services to call other applications or Web services. JAX-RPC provides a programming model for the development of SOAP (Simple Object Access Protocol)-based applications. The JAX-RPC programming model simplifies development by abstracting SOAP protocol-level runtime mechanisms and providing mapping services between Java and the Web Services Description Language (WSDL). This will, therefore, follow the J2EE 1.4 standard and will be able to support any compliant J2EE 1.4 implementation.

The WSUAF also provides support for the most widely distributed web services plug-in solution which is the Axis SOAP plug-in from the Apache organization. The WSDK uses the Axis Handler framework, which is very similar to the JAX-RPC handler framework.

SDK High Level Architecture—Usage and Bill Authorization Web Service—Case #1

Figure 9:
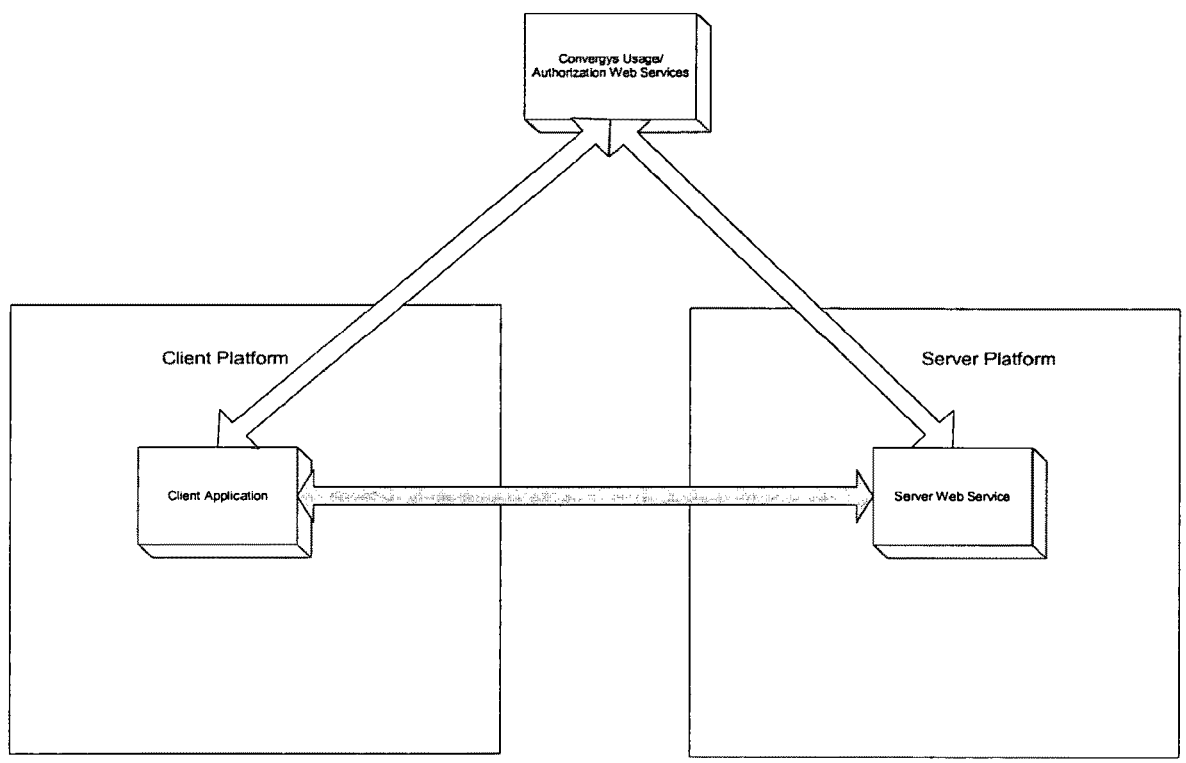
FIG. 9 High Level Diagram showing the acquisition of usage and billing authorization on either the client and/or server side. Also shown is that the acquired usage may be forwarded to a Web Service usage collection service.

Referring to FIG. 9, in one embodiment, WSUAF may allow the acquisition of usage and billing authorization on both the client and server side. WSUAF provides for the real-time acquisition of service usage data and, in another embodiment, WSUAF supports the ability for batch acquisition of usage. Real-time usage acquisition provides a simple service to send discrete units of usage with either a success or failure return code. Batch services allow for the transfer of batches of usage records via files and a specified standard protocol such as ftp. These services follow the message exchange protocol of request and response. More complicated message exchange protocols may also be utilized in the toolkit. Bill Authorization may be supported with a simple request and reply protocol with the backend bill authorization system.

Usage and Bill Authorization Stack Instrumentation—Case #2

Figure 10:
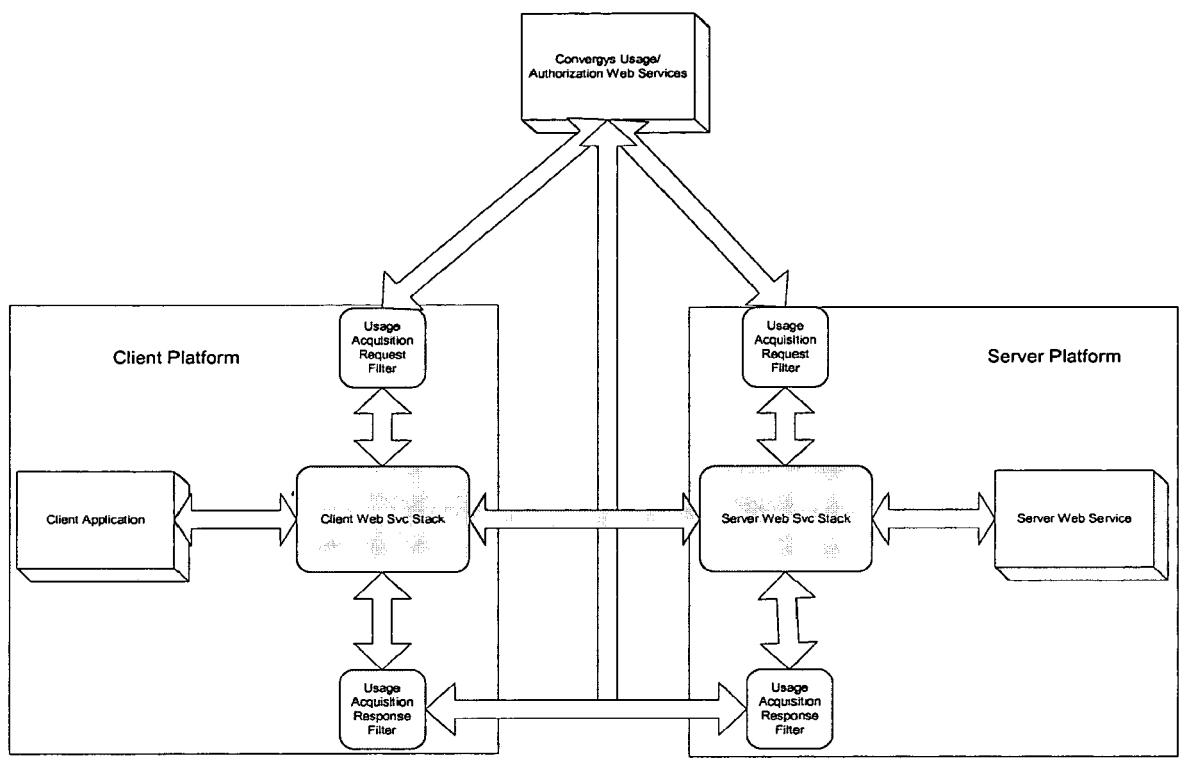
FIG. 10 illustrates one embodiment of a High Level Diagram showing the instrumentation of the Web Services SOAP stack on both the client and server side of the Web Service and the possible connections to the Web Service Usage Collection and Billing Authorization services.

Instrumenting the stack for the acquisition of usage and the bill authorization of a web service involves the use of filters/handlers and the WSUAF web service deployment descriptor. A software version of filter technology is usually provided by the application server vendor to enable pre- and post-message processing. Some technologies have standardized the use of filters via organizational specifications. The CORBA specification from the Object Management Group (OMG) identifies filters as interceptors, in the Java JAX-RPC specification they may be referred to as handlers and as part of the Apache Axis framework they may be referred to as handlers. Referring, again, to FIG. 9, the web services stack resides on both the requesting client and on the service provider's platforms. Referring to FIG. 10, filters can be inserted into the stack on either the server or client side. Filters can also capture information of the outgoing request stack of the client and the incoming request stack of the server. Also the filters can be used on the outgoing response stack of the service server and the incoming response stack of the client. The configuration and deployment and possibly extension of the usage acquisition handlers enable the ability to capture service usage. The design will explain in detail the plug-ability, flexibility, and extensibility of using a framework that exploits the use of handlers to capture web service usage.

Once the WSUAF stack handlers may be installed, an initialization process occurs which cause WSUAF to search for the deployment descriptor, which describes which Web Services WSUAF will meter and authorized. Contained within the deployments/descriptor may be a usage and a bill authorization section. Each section contains a list of Web Services that may be either metered or bill authorized. Each service method may identify when the data may be extracted either on the service request and/or response. On each listed service method may be a list of data fields that may be extracted from the Web Service SOAP message, and any data manipulation primitives that may be preformed and/or interpolated into the usage data event or bill authorization request. Below is a simplified textual example of a deployment descriptor. More detailed examples of WSUAF Web Service descriptor may be disclosed using XML standards.

---

Begin Usage Section:
  Begin List WebServices to capture usage
    WebServiceA
      MethodX at Request and Response
        Fields to Extract-Manipulate from Service: FieldA, FieldB, FieldC, DateAndTimeStamp, AddConstantD, Add FieldA and FieldB
    WebServiceB at Response
      MethodY
        Fields to Extract-Manipulate from Service: FieldA, FieldB, DateAndTimeStamp,AddConstantD, Sub FieldA and FieldB
  End List WebServices to capture usage
End Usage Section:
Begin Bill Authorization Section:
  Begin List WebServices to perform Bill Authorization
    WebServiceA
      MethodA at Request
        Fields to Extract-Manipulate from Service: FieldA, FieldB, DateAndTimeStamp, AddConstantC, Add FieldA and FieldB
    WebServiceE
      MethodB at Request
        Fields to Extract-Manipulate from Service: FieldA, FieldZ, DateAndTimeStamp, AddConstantC, Add FieldA and FieldB
  End List WebServices to perform Bill Authorization
End Bill Authorization Section:

---

In the usage section of the contrived WSUAF Web Service descriptor file, above, each service and service method that may be metered is listed. Also identified may be the data fields that may be extracted, added and/or manipulated from the web service and packaged into an event to be forwarded to an event collection or billing system.

Using the deployment descriptor above a simple example for one possible use of a time based usage-billing model will be explained. Based on the WSUAF descriptor usage section, when a Web Service Request for MethodA on WebServiceA may be made the WSUAF extracts and manipulates the identified data fields from the Web Service SOAP envelope, one of the fields being interpolated into the data may be a date and time stamp identifying the start time of the service. This information may be packaged into a usage event and sent to the billing system. When the Web Service Response occurs for MethodA on WebServiceA the identified data fields may be extracted and manipulated, one of the fields being a date and time stamp identifying the end time of the service. This information may be packaged into a usage event and sent to the billing system. The billing system would collate the events received from the WSUAF to bill the customer for duration of use for the Web Service. In the example above the usage information may be sent to a down-stream billing system to be billed and rated, there is also the possibility of the billing engine to be embedded within the Web Service server or be local to the Web Service Server to perform rating and billing in near real time.

Using the contrived WSUAF Web Service descriptor file above a few possible simple examples of a Web Service bill authorization will be explained. Based on the WSUAF descriptor bill authorization section, when a Web Service Request for MethodA on WebServiceA may be made the WSUAF extracts and manipulates the identified data fields from the Web Service SOAP envelope. One of the extracted fields may identify the price of the Web Service and the account number of the customer requesting the service. This information may be packaged into a bill authorization request and sent to the backend bill authorization system. The bill authorization system will return a response indicating the customer's ability to pay for the Web Service. If the authorization system indicates the customer can pay, then the Web Service request will continue. If the authorization system indicated that the customer does not have the ability to pay, then request may be terminated and a message may be returned to the customer explaining access to the service has been denied. Several other examples may be that authorization can be done based on the number of times the service may be accessed, a decrementing account balance, the volume of data, time of day, window of time, frequency of use, subscription dependencies, location of where the service will be rendered, for example if someone from Germany is requesting a streaming music web service request from America the bill authorization could deny this base on billing location, Web Service Usage Acquisition and Authorization Framework (WSUAF)

Figure 11:
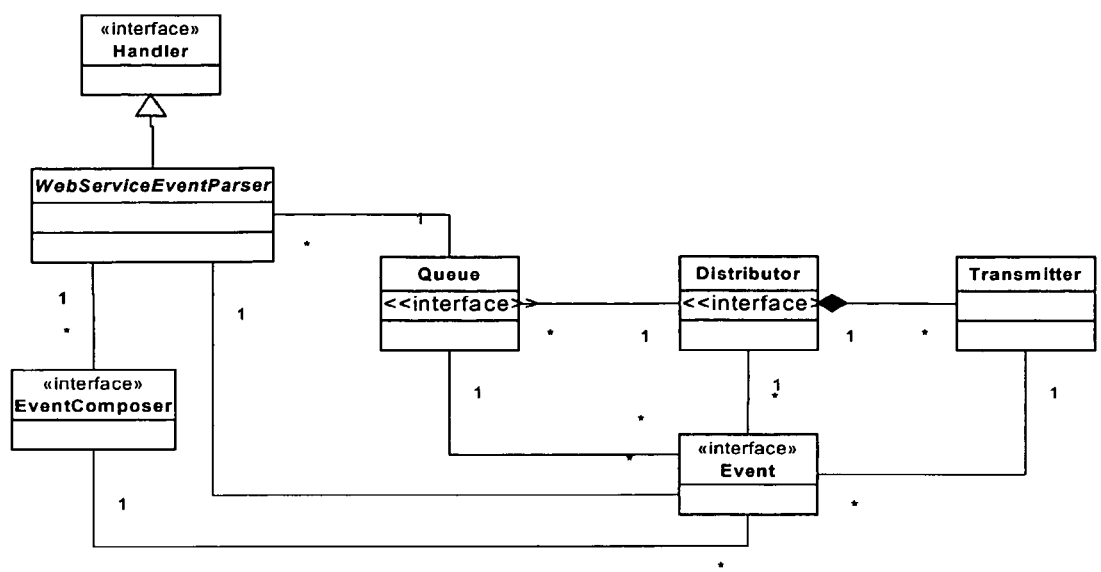
FIG. 11 illustrates one possible set of WSUAF core classes.

Referring to FIG. 11, the WSUAF comprises a set of abstractions that may be used within the instrumented web services stack. These frameworks may be used to manage the plug-ability, flexibility and scalability of the frameworks. Some of the flexibility may be accomplished through the use of the WSUAF Web Service deployment descriptor.

Some of the abstractions allow for a more object oriented event management and distribution rather than the management of an opaque byte stream of usage data. Service provider developers may have the option, depending on the embodiment of the invention they may be utilizing, of mixing the value-add web service with aspects of their application by using these frameworks. Alternatively, they may directly use the usage acquisition and bill authorization web service within their web service application. Using these frameworks provides for a more object-oriented interface to the usage event management within their applications. Also the frameworks allow for alternative load balancing and event distribution systems. The framework could provide the integration of other systems such as mediation and provisioning systems.

Real-Time Usage Acquisition—Use Case #1

One embodiment of the real-time usage acquisition messaging system may use a push protocol for sending usage messages to the web service mediation gateway. Other embodiments may support both push and pull protocols. Here is an example of a Java based push protocol interface, which is further detailed in the industry standard WSDL interface specification in the next few paragraphs.

public void processEvent(String event) throws ProcessEventException

When the service provider uses this interface, which will be more than likely generated from the WSDL, the event may be sent as a proprietary compliant formatted string. This may be simply a comma-separated list of strings with quoted string fields. Other more robust interfaces may support other event type formats such as an XML document, events sent as attachments for binary data and others. The interface will more than likely support additional arguments that would describe the event type and its properties in more detail. These may comprise hints to the receiving system on how to parse and handle the event.

If the usage acquisition web service encounters an error and cannot process the event a ProcessEventException may be thrown. The exception contains an error number and error message on the reason the event was not accepted. The event and error number and error message may be logged into event reject files. In one embodiment, the toolkit may provide an event management system for the provider to review rejected records and possibly fix them and then queue them for resubmission to the mediation web service, possibly using the batch usage acquisition portion of the WSUAF.

The following depicts one embodiment of the WSDL, for a basic proto-type implementation of the Usage Acquisition Web service, that may be available from the mediation gateway. This proto-type interface may be used to send discrete usage records directly to the backend billing and rating solution. A more fully featured WSDL interface would not only contain a simple string event type, but possibly some more strongly defined event types using XML Schema definitions. Also service methods to handle batch might be also be added.

```
<?xml version="1.0" encoding="UTF-8"?>
<wsdl:definitions
targetNamespace="http://gateway.usage.sdk.webservices.
advapps.cvg.com" xmlns="http://schemas.xmlsoap.org/wsdl/"
xmlns:SOAP-
ENC="http://schemas.xmlsoap.org/soap/encoding/"
xmlns:impl="http://gateway.usage.sdk.webservices.advapps.
cvg.com-impl"
xmlns:intf="http://gateway.usage.sdk.webservices.advapps.
cvg.com" xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema">
   <wsdl:message name="processEventRequest">
      <wsdl:part name="event" type="SOAP-ENC:string"/>
   </wsdl:message>
   <wsdl:message name="processEventResponse">
   </wsdl:message>
```

```
        <wsdl:message name="ProcessEventException">
            <wsdl:part name="cvs" type="SOAP-ENC:string"/>
        </wsdl:message>
        <wsdl:portType
name="UsageMediationServicePortType">
            <wsdl:operation name="processEvent"
parameterOrder="event">
                <wsdl:input message="intf:processEventRequest"/>
                <wsdl:output
message="intf:processEventResponse"/>
                <wsdl:fault message="intf:ProcessEventException"
name="ProcessEventException"/>
            </wsdl:operation>
        </wsdl:portType>
        <wsdl:binding
name="UsageMediationServicePortSoapBinding"
type="intf:UsageMediationServicePortType">
            <wsdlsoap:binding style="rpc"
transport="http://schemas.xmlsoap.org/soap/http"/>
            <wsdl:operation name="processEvent">
                <wsdlsoap:operation soapAction=""/>
                <wsdl:input>
                    <wsdlsoap:body
encodingStyle="http://schemas.xmlsoap.org/soap/encoding/"
namespace="http://gateway.usage.sdk.webservices.advapps.
cvg.com" use="encoded"/>
                </wsdl:input>
                <wsdl:output>
                    <wsdlsoap:body
encodingStyle="http://schemas.xmlsoap.org/soap/encoding/"
namespace="http://gateway.usage.sdk.webservices.advapps.
cvg.com" use="encoded"/>
                </wsdl:output>
            </wsdl:operation>
        </wsdl:binding>
        <wsdl:service name="UsageMediationService">
            <wsdl:port
binding="intf:UsageMediationServicePortSoapBinding"
name="UsageMediationServicePort">
                <wsdlsoap:address
location="http://localhost:8080/axis/services/
UsageMediationServicePort"/>
            </wsdl:port>
        </wsdl:service>
    </wsdl:definitions>
```

Gateway Web Service

The usage mediation service may be hosted on a web server at a managed location. The mediation web service receives usage events from web service providers and finalizes the event formatting and loads the events into, for example, a billing system.

Usage Acquisition in the Web Service Stack

This section will address a design for capturing web service usage data by instrumenting the web services stack, an explanation of an implementation for bill authorization would be almost identical because it would leverage the existing abilities of frameworks, so this mainly explains usage acquisition with references to bill authorization where clarification may be needed. Instrumenting the stack provides a non-intrusive mechanism to capture web service usage information without directly affecting the web service application itself. The solutions presented may work in an Apache Axis solution or any JAX-RPC compliant web service framework, but may not be the only solutions that will be available. The design solution leverages the use of handlers that may be available in both the Axis solutions and JAX-RPC standard. The use of handlers in this solution may be exactly what handlers were designed to provide, the ability to intercept service method/messages prior to entering the actual service. The use of handlers is not unique to Axis and JAX-RPC there may be similar solutions in other applications server technologies such as CORBA. This design assumes the use of handlers in application servers is becoming standard and therefore will make this solution will be widely applicable.

Request, Response and Fault Management

Figure 12:
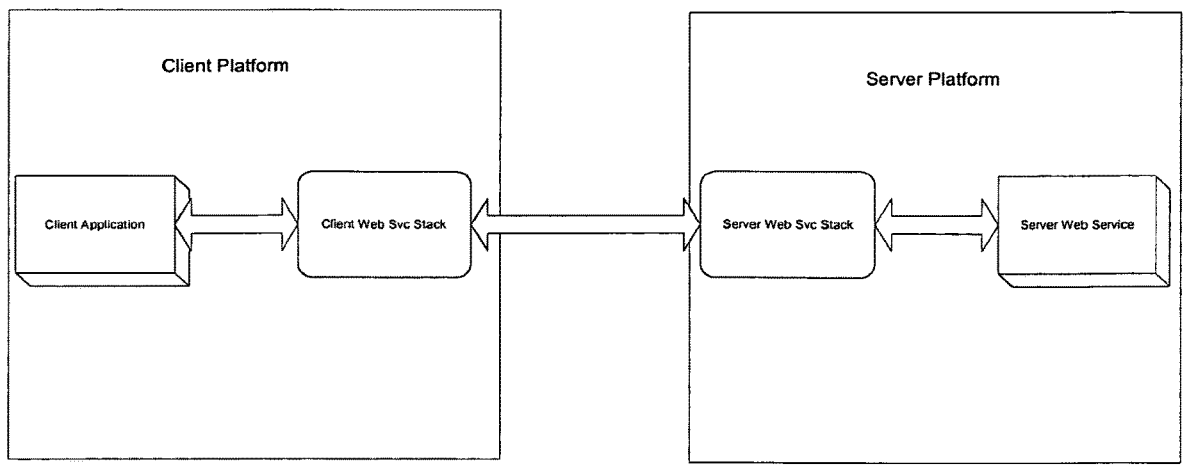
FIG. 12 illustrates an example of a Logical Web Service communication path between client and server.

Referring to FIG. 12, physically there may be two web service stacks that a web service request, response or fault will pass. There is the requesting client web service stack and the responding web service server's stack.

Figure 13:
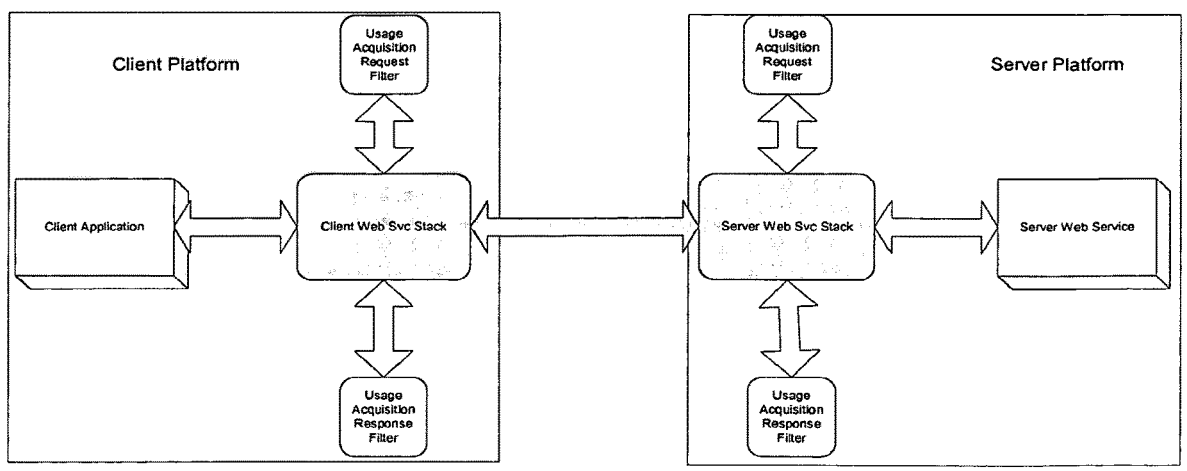
FIG. 13 High Level Diagram showing an embodiment of the instrumentation of the Web Services SOAP stack on both the client and server side of the Web Service for usage acquisition, which may also be the same for billing authorization

Referring to FIG. 13, usage handlers or bill authorization handlers can be placed on either stack capturing data on either a request or a response or possibly both.

Figure 14:
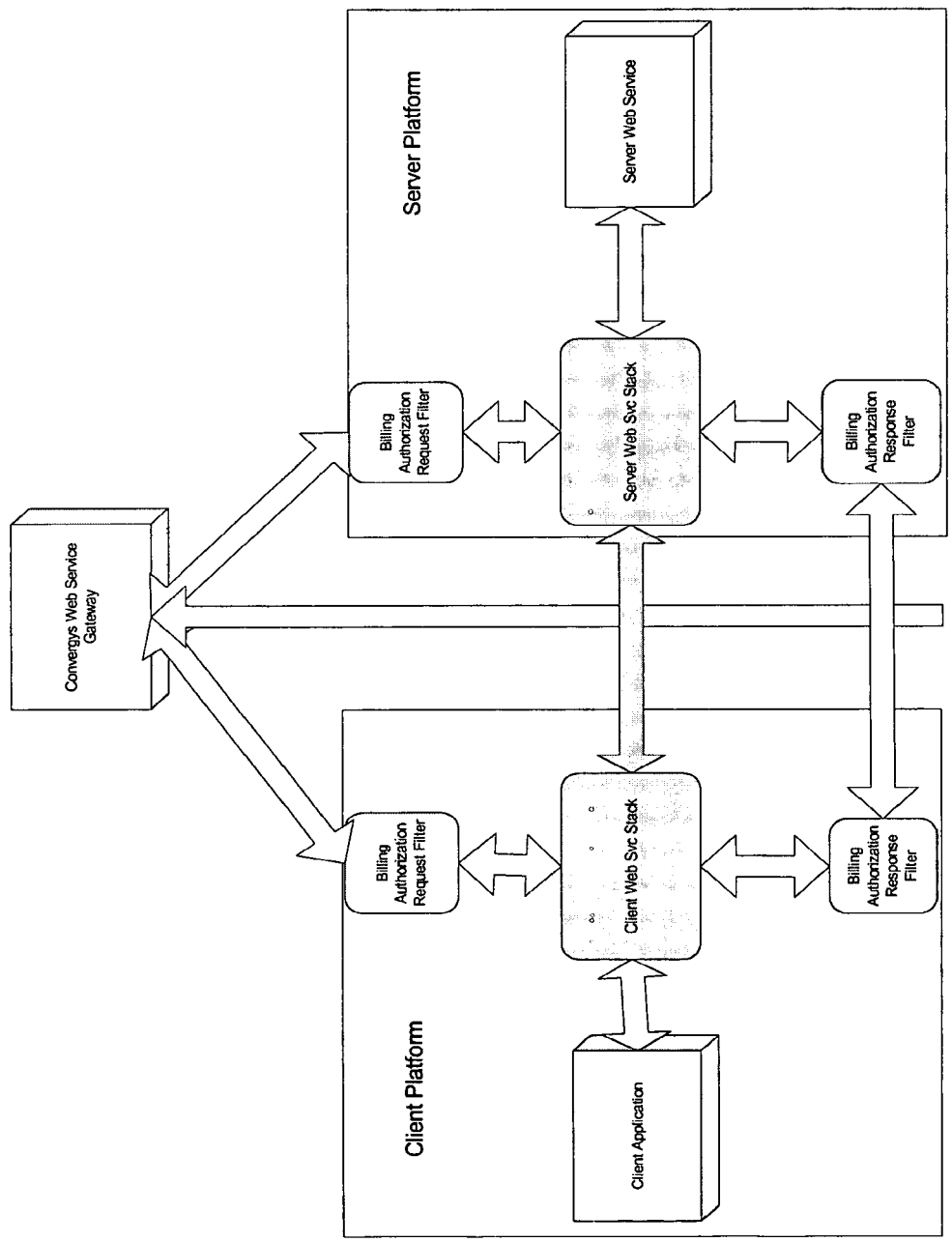
FIG. 14 illustrates one embodiment of a High Level Diagram showing the instrumentation of the Web Services SOAP stack on both the client and server side of the Web Service and the possible connections to the Web Service Usage Collection and Billing Authorization services but showing an example of billing authorization instrumentation of the SOAP stack.

Referring to FIG. 14, once the usage may be captured it may then be forwarded onto the Web Services Gateway to be rated, billed and settled. Or in the case of a bill authorization request, the authorization data may be captured from the SOAP web service request and formulated into a bill authorization request and sent to the Web Service Gateway for bill authorization.

It may be important to remember that a fault can occur anywhere along the request and response path. It may be important to place the usage acquisition and bill authorization handler in a location where the service may be guaranteed to be rendered.

Figure 15:
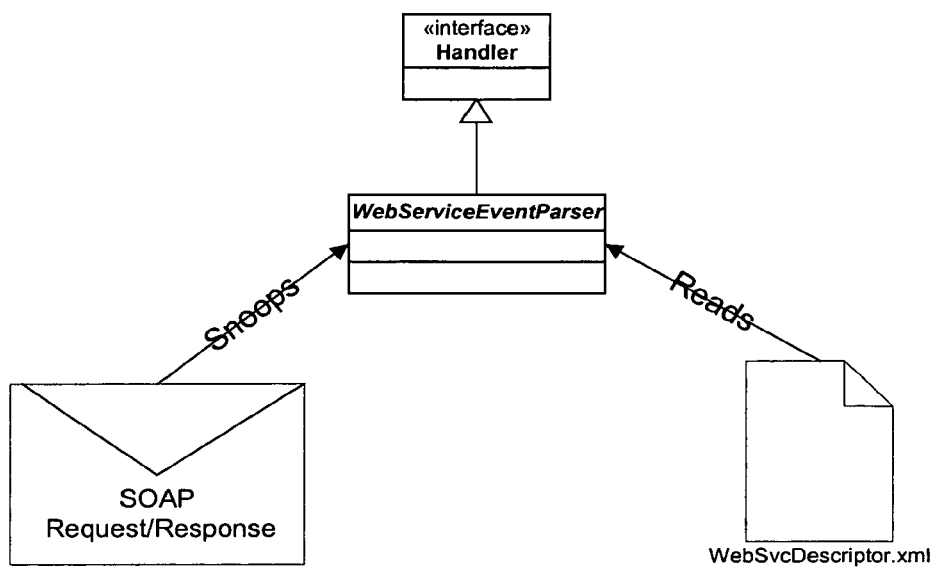
FIG. 15 depicts a possible diagram showing the inputs to the WebServiceEventParser.

Referring to FIG. 15, the WSUAF provides one standard handler that may be called the WebServiceEventParser. This class snoops the SOAP envelopes searching for metered and bill authorized web services. The WebServiceEventParser knows which services may be metered and bill authorized by reading the metered and bill authorization service information from the WSUAF descriptor file (WebSvcDescriptor.xml). The WSUAF Descriptor file contains a list of services that may be metered and bill authorized.

Figure 16:
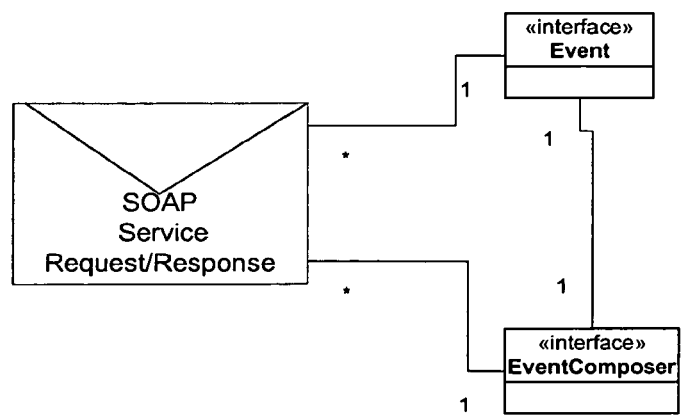
FIG. 16 depicts on possibility of the cardinality relationships between the SOAP request/response and the EventComposer and the composed Event.

Referring to FIG. 16, Once the WebSvcEventParser has parsed the SOAP envelope and found a metered or authorized service it continues to parse the SOAP envelope passing the parsed information to an EventParser implementation that may be looking for metered or bill authorization fields that may be specified in the WSUAFdescriptor file. The WebServiceEventParser does not compose the usage event or bill authorization request. An event composer may be used to compose the usage event or bill authorization request. The WebServiceEventParser notifies the event composer of key points in the parse such as start, finish, service name, service method, parameters and others key items in the SOAP envelope. Each metered service and bill authorized web service may be associated with an event composer. A metered usage service may also be associated with an event type.

Figure 17:
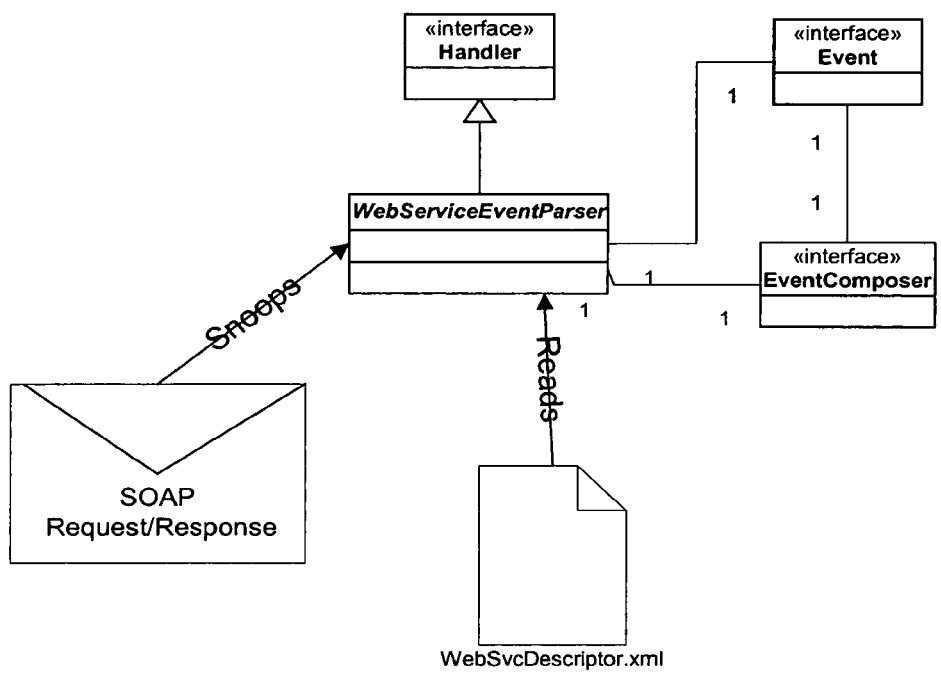
FIG. 17 illustrates a possible diagram of WebServiceEventParser, EventComposer and Event relationships

Referring to FIG. 17, the event parser periodically calls into the event composer at key points in the parsing passing in parseddata from the XML SOAP envelope. The data passed into the event composer may be devoid of any XML, in this embodiment, only the element name and the element value may be passed into the event composer. This frees the event composer from parsing the XML envelope and allows the composer to concentrate on composing the usage event or authorization request.

After the WebServiceEventParser has completed parsing, the composer may be notified that there is no more data and the event may then be enqueued to be sent to the Web Services Gateway or a bill authorization request may be immediately made and the response of the bill authorization request will determine whether the request for the Web Service will continue.

Session Management

There may be a need to acquire usage or bill authorization information over several web service invocations. If this is the case, then there may be a need for a way to save event data (state) over those invocations. To save state over several invocations, the WSUAF may provide a session management infrastructure.

Events

Event classes may be used to compose events. The composed usage events may be enqueued and sent to the Web Services Gateway. Composed bill authorization requests may be sent immediately to the Web Services Gate for a bill authorization response. The base interface may be the Event interface for all events. This interface may contain no methods—it may only be a marker interface that may be used internally by the WSUAF. Events may be opaque objects to the core WSUAF. Only the event composer and the usage event transmitter may be interested in the events as objects. The composer sets the data on the event and the transmitter usually calls a serialization method on the event to send it to the Web Services Gateway. Currently, the serialization method on events used by the event transmitter is:

public String toEvent( );

This method may be actually defined on the Event interface. This method may be used to stringify [serializing a structured data type into a string] to serialize the event into a serialized string.

Standard Implementations

Figure 18:
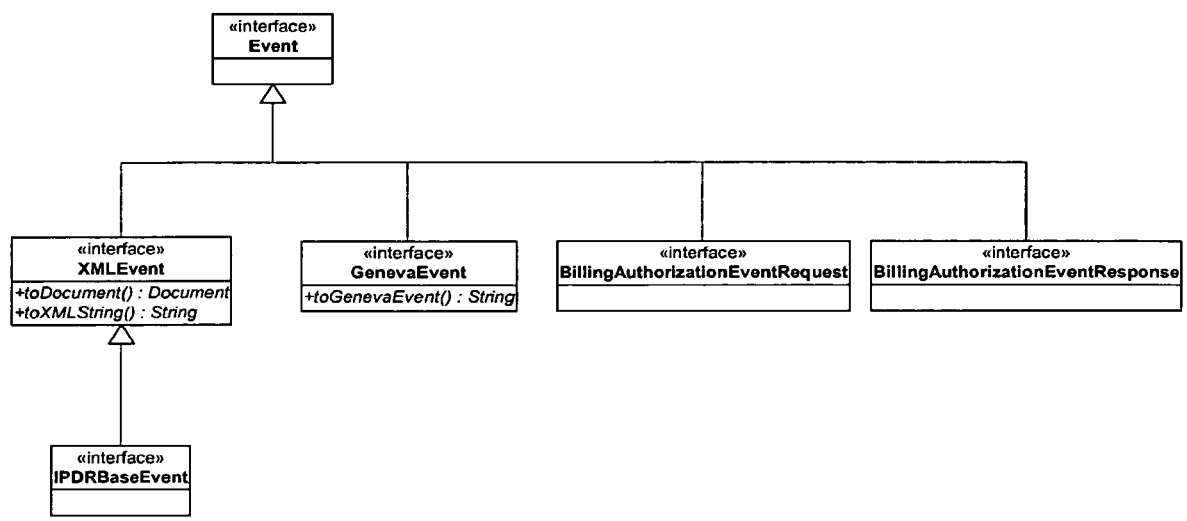
FIG. 18 illustrates one example of Usage and Billing Authorization Event types and their hierarchies.

There may be several other interfaces and base classes that extend and implement the Event interface. Most of these only provide a serialization methods. A serialization method has the ability to convert a structured type into a flat or opaque type model, which may be more convenient for storing onto storage mediums and streaming across network architectures. Referring to FIG. 18 and below, there are some common event interfaces and their serialization methods.

Interface: XMLEvent: toDocument( );
toXMLString( );
Interface: StringEvent: toString( );
Interface: GenevaEvent: toGenevaEvent ( );
Abstract Class: IPDRBaseEvent extends XMLEvent—

Event Composers

Event composers may be used to compose events. The EventComposer may be periodically called during key points in the SOAP envelope parsing by the web service EventParser. The WSUAF has a standard event composers for usage event composition and bill authorization requests. The standard EventComposer may not contain all the features required by a service provider. The EventComposer interface may be open and extensible to allow service providers to implement their own composers.

Event Composer Methods

Prior to the EventParser parsing the SOAP envelope the EventParser invokes the "startRequest" method on the EventComposer passing in the current SOAP message and the event class associated with the request. The EventComposer's "startRequest" method may be where the event composer may be given the opportunity to initialize and create a new usage event. The composer will return the event that will be composed from the current service invocation. This event will be passed to the composer at each subsequent state change along with the element name and element type. Returning the event back to the event parser keeps the event thread safe and ensures the right event may be used with each state transition. After the finish state has completed the event parser enqueues the event to be sent. If the event composer returns null after the transition to the start state then the event parser assumes the composer parsed, composed and enqueued the event.

The "Service" method may be called on the EventComposer passing in the service name when the EventParser has found the service name within the SOAP envelope.

The "Method" may be called on the EventComposer passing in the method name when the EventParser has found the event name within the SOAP envelope.

"Transport" may be called on the EventComposer passing in the transport type when the EventParser has found the transport type within the SOAP envelope.

"Operation" may be called on the EventComposer passing in the operation name when the EventParser has found the operation name within the SOAP envelope.

"Client Address" may be called on the EventComposer passing in the client address when the EventParser has found the client address within the SOAP envelope.

"Headers" may be called on the EventComposer passing in the SOAP headers when the EventParser has found the SOAP headers within the SOAP envelope.

"Body" may be called on the EventComposer passing in the SOAP Body when the EventParser has found the SOAP Body within the SOAP envelope.

"Params" may be called on the EventComposer passing in the parsed usage parameters when the EventParser has found a usage parameter within the SOAP envelope.

"Trailers" may be called on the EventComposer passing in the SOAP trailers when the EventParser has found the SOAP trailers within the SOAP envelope.

"Finish" may be called on the EventComposer when the EventParser has completed parsing the SOAP envelope. If the EventComposer does not return an event then the EventParser assumes that the EventComposer has handled the event and will not enqueue the event.

Figure 19:
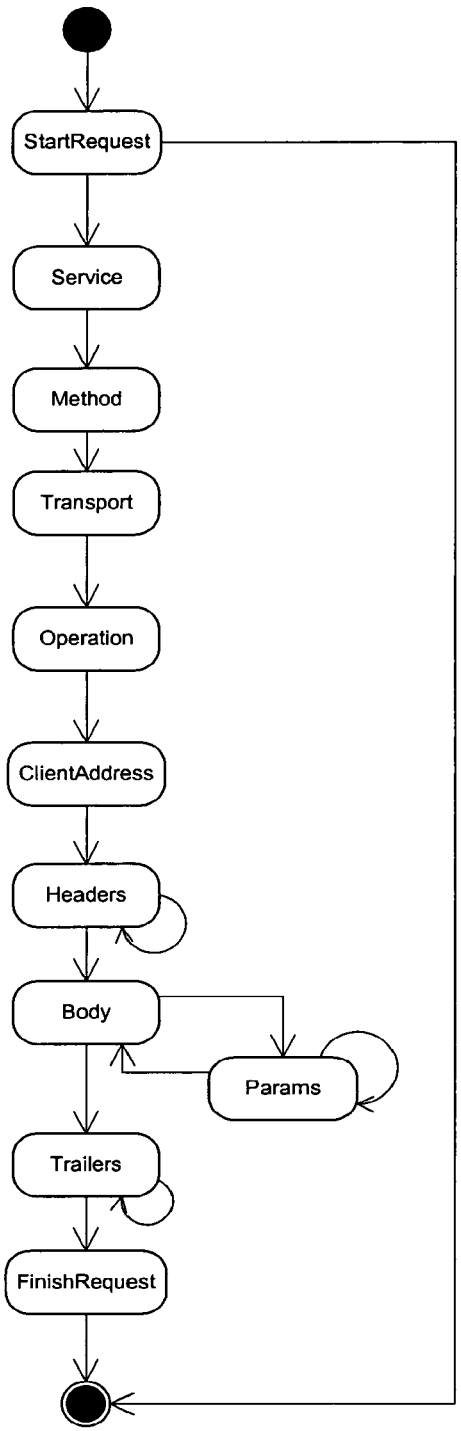
FIG. 19 illustrates one example of an Event Composer State diagram.

Referring to FIG. 19, this state diagram identifies the order in which the web service event parser sequences an event composer. The same diagram may be used for a service response except the startResponse state may be the initial state and the finishResponse state may be the final state. An event composer can bypass all states except the start state. This allows the composer the option to parse the complete envelope instead of the event parser.

"Interface"

The interface listed below may be for the Axis environment; there may be another interface for the JAX-RPC environment. This may be the Java implementation of the abstract interface (EventComposer) that is explained above.

```
public interface EventComposer {
    /**
     * Called prior to when a request message is to be parsed. The
       <code>MessageContext<code>
     * is passed in case there are any pre-parsing information to be
       captured by a composer.
     * @param msgContext The service message request.
     * @param eventClass The class to instantiate the event.
     * @return The event that is to be queued when parsing is
   finished.
     */
public Event startRequest(MessageContext msgContext, Class
   eventClass) throws EventException;
    /**
     * This is called after all parsing of the request message is
   complete.
     * When this method returns the returned event is queued for
   distribution.
     *
     * @param event The event that is being composed.
     * @param msgContext The service message context.
```

```
         * @return The event that will be enqueued for distribution.
         */
        public Event finishRequest(Event event, MessageContext
    msgContext) throws EventException;
        /**
         * Called just prior to parsing a response service message. The
         * <code>MessageContext<code> is passed in case there are any
    pre
         * parsing information to be captured by a composer.
         *
         * @param msgContext The service message context
         * @return The event that is to be queued when parsing is
    finished.
         */
    public Event startResponse(Event event, MessageContext
    msgContext) throws EventException;
        /**
         * This is called after all parsing of the response message is
    complete.
         * When this method returns the returned event is queued for
    distribution.
         *
         * @param event he event that is being composed.
         * @param msgContext The service message context
         * @return The event that will be enqueued for distribution.
         */
    public Event finishResponse(Event event, MessageContext
    msgContext) throws EventException;
        /**
         * The name of the service being processed.
         *
         * @param service Name of the service.
         */
    public void service(Event event, String service) throws
    EventException;
        /**
         * The name of the service method being called.
         *
         * @param method Name of the method.
         */
    public void method(Event event, String method) throws
    EventException;
        /**
         * This is the type of tranport used for the service request.
         *
         * @param transport Name of transport used to service the
    request.
         */
        public void transport(Event event, String transport) throws
    EventException;
        /**
         * Identifies the type of service method invocation such as rpc.
         * @param operation Identifies the service mehtod operation
    style.
         */
    public void operation(Event event, String operation) throws
    EventException;
        /**
         * This is the host address of the requesting client.
         *
         * @param hostaddr The address of the remote client.
         */
    public void clientRemoteAddress(Event event, String hostaddr)
    throws EventException;
        /**
         * Called prior to processing the headers of the service request.
         *
         * @param headers Contains a <code>Vector<code> of zero or
    more
         * <code>MessageElement<code> objects.
         * @throws EventException
         */
    public void headers(Event event, Vector headers) throws
    EventException;
        /**
         * Called prior to processing the bodies of the service request.
         * The <code>Vector<code> contains zero or more bodies of
    type
         * <code>MessageElement<code>
         *
         * @param bodies List of message element bodies.
         * @throws EventException
         */
        public void bodies(Event event, Vector bodies) throws
    EventException;
        /**
         * Called prior to processing the trailers of the service request.
         * The <code>Vector<code> contains zero or more trailers of
    type
         * <code>MessageElement</code>
         *
         * @param trailers List of message element trailers.
         * @throws EventException
         */
        public void trailers(Event event, Vector trailers) throws
    EventException;
        /**
         * This called after each parsed parameter.
         *
         * @param event The event being composed.
         * @param name The parameter name
         * @param o The parameter value.
         */
    public void param(Event event, String name, Object value) throws
    EventException;
        }
```

Standard Implementations

Currently there may be two platform event composer implementations one for the Axis environment and one for the JAX-RPC environment.

The Axis package com.cvg.advapps.webservices.sdk.usage.axis contains the class WebServicesEventParser and the interface EventComposer. These may be the only two Axis specific items in the WSDK. The WebServicesEventParser is the global or service handler that will be registered to snoop and parse the SOAP envelope for metered services and data.

JAX-RPC

The package com.cvg.advapps.webservices.sdk.usage-.jaxrpc contains the class WebServicesEventParser and the interface EventComposer. These may be the only two JAX-RPC specific items in the WSDK. The WebServicesEventParser is the service handler that will be registered to snoop and parse the SOAP envelope for metered services and data.

WSUAF Web Service Deployment Descriptor

The WSUAF must be able to access the deployment descriptor, which describes the services and associated data to be metered and bill authorized by the WSUAF. This information may be described, usually by a web service provider's administrative staff, in the deployment descriptor prior to the runtime operation of any metered or bill authorized services. The format of this file follows XML version 1.0 specifications and the schema definition for the deployment descriptor follows the XML-Schema 1.0. The information contained in the WSUAF service descriptor can be used by any of the classes in the WSUAF, but may be mainly used by the EventParser to identify which services may be metered and by the EventComposer to identify what usage and bill authorization data may be captured, manipulated or interpolated within the Web service and what type of event or request may be formulated. Below is the W3C industry standard XML DTD and Schema that describes the format of the Metered Service Deployment Descriptor:

```xml
<?xml version="1.0" encoding="UTF-8"?>
<!-- WSUAF Describe services that metered and bill authorized -->
<!ELEMENT WSUAF (meteredWebServices, billAuthorizedWebServices)>
<!-- Identifies the bill authorized services and method where data is captured/manipulated -->
<!ELEMENT billAuthorizedWebServices (service+)>
<!-- Identifies the metered services and method where data is captured/manipulated -->
<!ELEMENT metered WebServices (service+)>
<!-- Identifies the services where data is captured/manipulated -->
<!ELEMENT service (method+)>
<!ATTLIST service name CDATA #REQUIRED>
<!-- Identifies the methods where data is captured/manipulated -->
<!ELEMENT method (param+, constant+)>
<!ATTLIST method
    name CDATA #REQUIRED
    composer CDATA #REQUIRED
    event CDATA #REQUIRED
    flow CDATA #REQUIRED
>
<!-- defined captured/manipulated data -->
<!ELEMENT param (#PCDATA)>
<!ATTLIST param name CDATA #REQUIRED>
<!-- defined constant data -->
<!ELEMENT constant (#PCDATA)>
<!ATTLIST constant name CDATA #REQUIRED>
```

XML Schema of the WSUAF Deployment Descriptor

```xml
<?xml version="1.0" encoding="UTF-8"?>
<!DOCTYPE xs:schema SYSTEM
"C:\projects\advapps\WebSvcBilling\patent\wsuaf.dtd">
<xs:schema xmlns:xs="http://www.w3.org/2001/XMLSchema"
elementFormDefault="qualified">
    <xs:element name="WSUAF">
      <xs:complexType>
        <xs:sequence>
          <xs:element ref="meteredWebServices"/>
          <xs:element ref="billAuthorizedWebServices"/>
        </xs:sequence>
      </xs:complexType>
    </xs:element>
    <xs:element name="billAuthorizedWebServices">
      <xs:complexType>
        <xs:sequence>
          <xs:element ref="service" maxOccurs="unbounded"/>
        </xs:sequence>
      </xs:complexType>
    </xs:element>
    <xs:element name="constant" >
      <xs:complexType>
        <xs:simpleContent>
          <xs:extension base="xs:string">
            <xs:attribute name="name" type="xs:string" use="required"/>
          </xs:extension>
        </xs:simpleContent>
      </xs:complexType>
    </xs:element>
    <xs:element name="meteredWebServices">
      <xs:complexType>
        <xs:sequence>
          <xs:element ref="service" maxOccurs="unbounded"/>
        </xs:sequence>
      </xs:complexType>
    </xs:element>
    <xs:element name="method" >
      <xs:complexType>
        <xs:sequence>
          <xs:element ref="param" maxOccurs="unbounded"/>
          <xs:element ref="constant" maxOccurs="unbounded"/>
        </xs:sequence>
        <xs:attribute name="name" type="xs:string" use="required"/>
        <xs:attribute name="composer" use="required"/>
        <xs:attribute name="event" use="required"/>
        <xs:attribute name="flow" type="xs:string" use="required"/>
      </xs:complexType>
    </xs:element>
    <xs:element name="param" >
      <xs:complexType>
        <xs:simpleContent>
          <xs:extension base="xs:string">
            <xs:attribute name="name" use="required"/>
          </xs:extension>
        </xs:simpleContent>
      </xs:complexType>
    </xs:element>
    <xs:element name="service" >
      <xs:complexType>
        <xs:sequence>
          <xs:element ref="method" maxOccurs="unbounded"/>
        </xs:sequence>
        <xs:attribute name="name" type="xs:string" use="required"/>
      </xs:complexType>
    </xs:element>
</xs:schema>
```

Roles

In this section we describe the roles and responsibilities of each person in the development and management of a metered service using the instrumented web services stack.

Development

Developers may be responsible for defining event composers and events when necessary. The developer should develop the relationship between event and event composer within the WebSvcDeployment.xml file. The developer may also identify the list of fields that may be captured with the metered and bill authorized services and possibly any data manipulation that should occur or constants that should be interpolated into the event.

Deployment

Deployers may be responsible for associating the appropriate services with the appropriate event composers and events. Also the deployer may adjust any fields and constants identified in the deployment descriptor.

Administration

It may be the administrator's responsibility to ensure the appropriate server and software is installed and available.

Rating SDK Framework

Once an event is parsed and composed by the web service event parser and composer the event or request must be sent to the Billing System and/or possibly another system. There may be a framework to help manage the performance, scalability and flexibility of propagating events to event collection systems.

Figure 20:
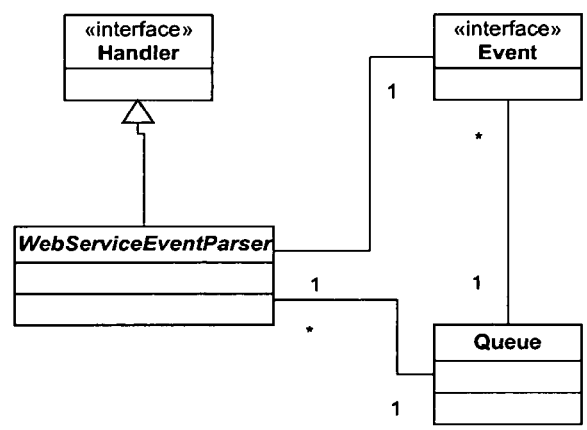
FIG. 20 illustrates on embodiment including the EventParser and Event Dispatch relationships for Usage Acquistion.

The discussion below discusses the abstract architecture of the WSUAF event propagation. Referring to FIG. 20, once an event may be composed it may be queued by the event parser for dispatch.

Figure 21:
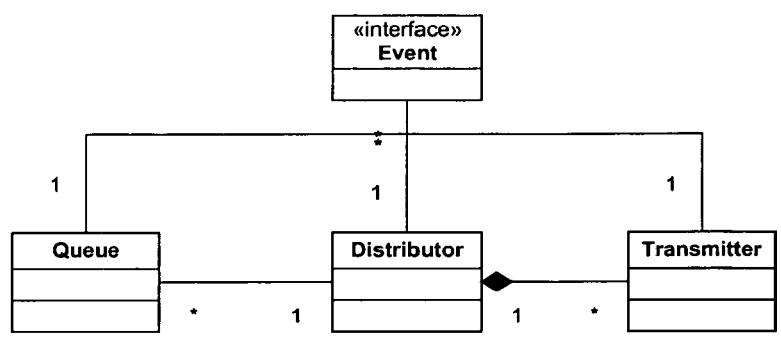
FIG. 21 illustrates one diagram of classes involved in the Web Service usage Event dispatches.

Referring to FIG. 21, once an event may be enqueued, an event distributor will pull the event off the queue and dispatch the event to registered transmitters that have subscribed to the queued event.

Once a transmitter has an event, it may be the responsibility of the transmitter to forward the event to the appropriate system.

Queues,

Events that may be forwarded to systems outside of the web service may be stored in a framework queue. Queues can be either inside or outside the address space of the event parser. The queues may be used to help load balance the number of simultaneous web service event propagations.

Interface

The web service event parser uses the standard queue interface. The event parser may be unaware of the queue implementation it may be handed. This may be because the web service event parser gets a reference to the queue form the singleton factory class SystemEventQueue. The SystemEventQueue determines the implementation based the queue configuration information in the wsdk.xml configuration file which is an XML 1.0 conformant file that contains WSUAF configuration information.

Below is standard event queue interface. As can be seen below this interface may be nothing more than an abstract representation of a standard programming queue with a basic priority model:

```
public interface EventQueue {
    static public final byte HIGH = 0;
    static public final byte MEDIUM = 1;
    static public final byte LOW = 3;
    /**
     * Put event into the pool at <b>MEDIUM<b> priority.
     *
     * @param event An event of interest that is to be pooled.
     */
    public void put(Event event);
    /**
     * Get the next event from the pool of any priority. The does a
    destructive
     * get of the next event. This essentially has the same semantics
    as a
     * <code>remove( )<code> @return The next event from the
    pool
     */
    public Event get( );
    /**
     * Put the event in the queue at the specified priority.
     *
     * @param event Event being queued.
     * @param priority Prioirty of queued event.
     */
    public void put(Event event, byte priority);
    /**
     * The next event of the specified priority.
     *
     * @param priority The priority of the next event to get.
     * @return The next event of the given priority. If this is not a
    blocking
     * call to the queue then <b>null should be returned<b>to
     indicate there * is no events available.
     */
    public Event get(byte priority);
    /**
     * Remove the <code>event<code> from the pool.
     *
     * @param event The event to be removed.
     * @return <code>True<code>if event was found and removed
    <code>false<code> if event
     * was not found.
     */
    public boolean remove(Event event);
}
```

Distributors

Figure 22:
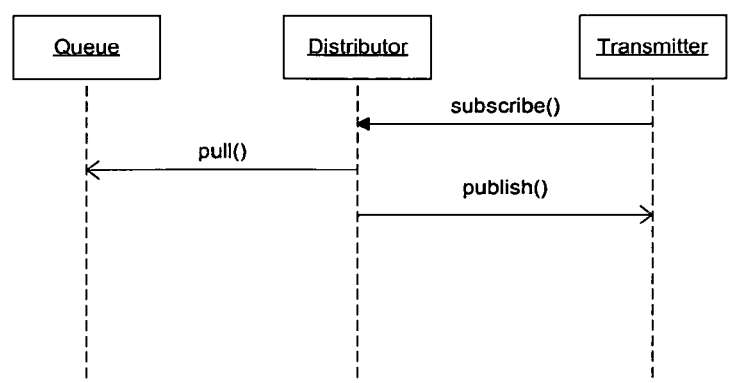
FIG. 22 illustrates a possible sequence diagram of Web Service usage event dispatch classes.
Figure 23:
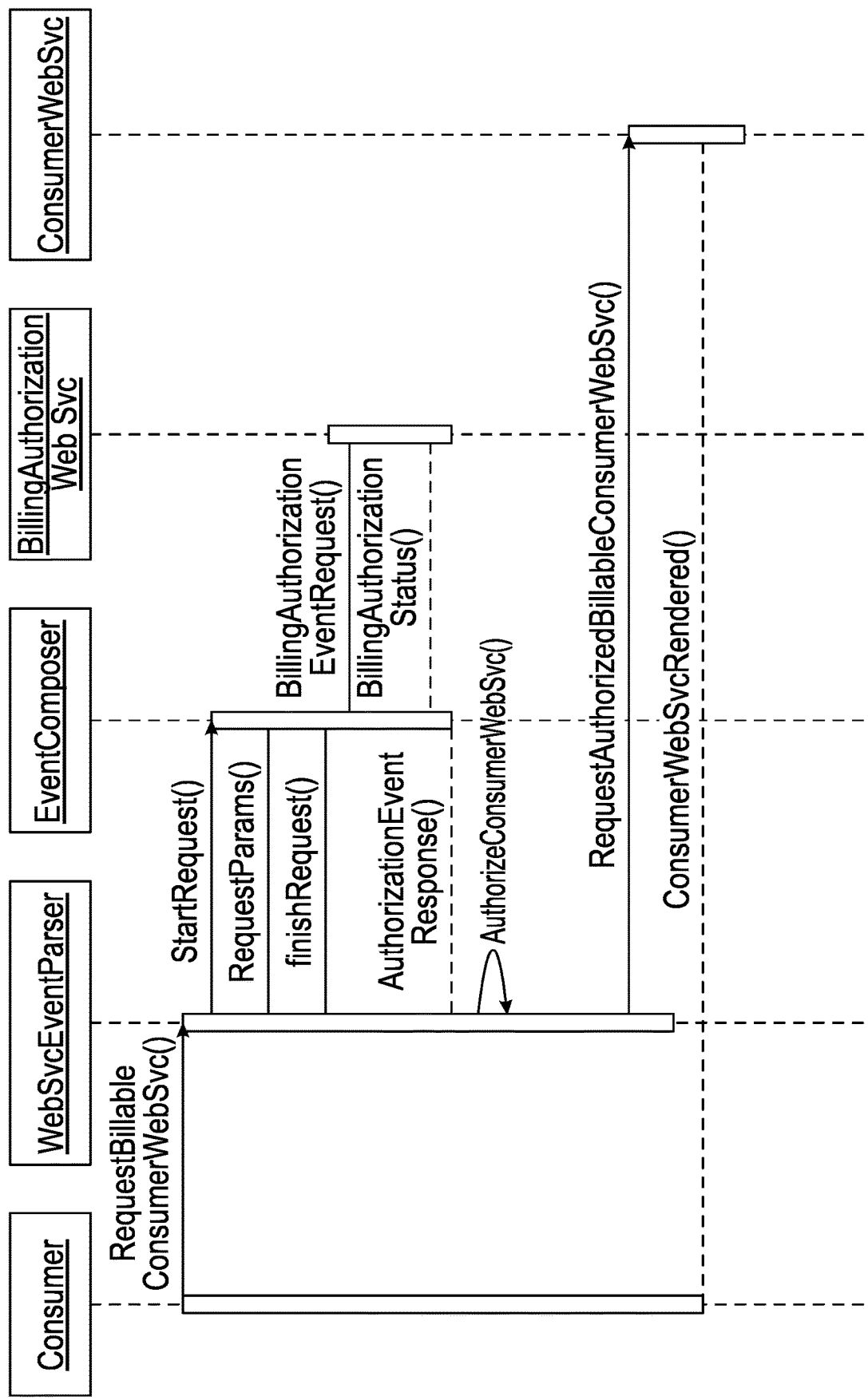
FIG. 23 illustrates a possible sequence diagram of successful authorization (via ability to pay/bill) access to a consumer web service.
Figure 24:
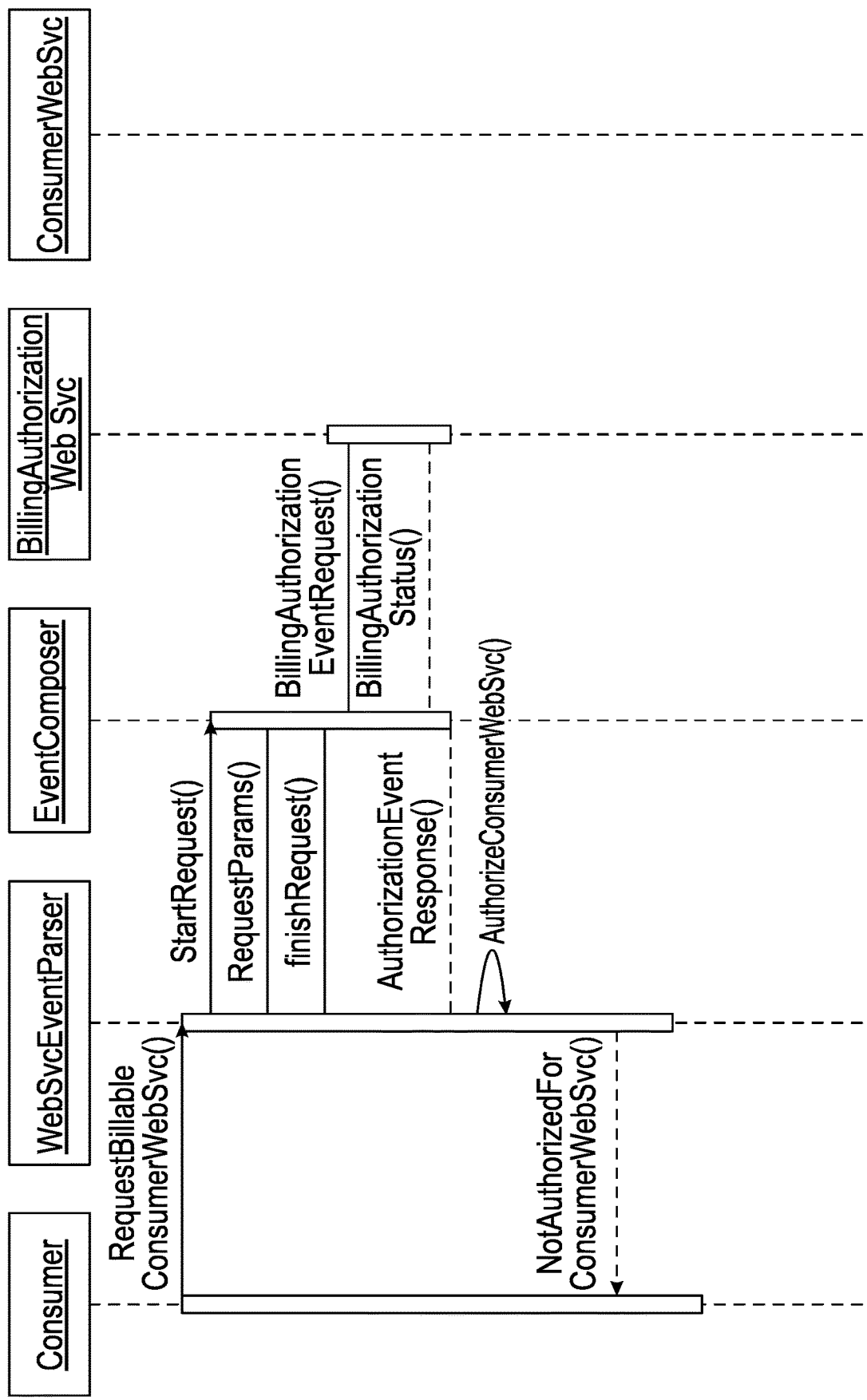
FIG. 24 illustrates a possible sequence diagram of an unsuccessful authorization (via ability to pay/bill) access to a consumer web service.
Figure 25:
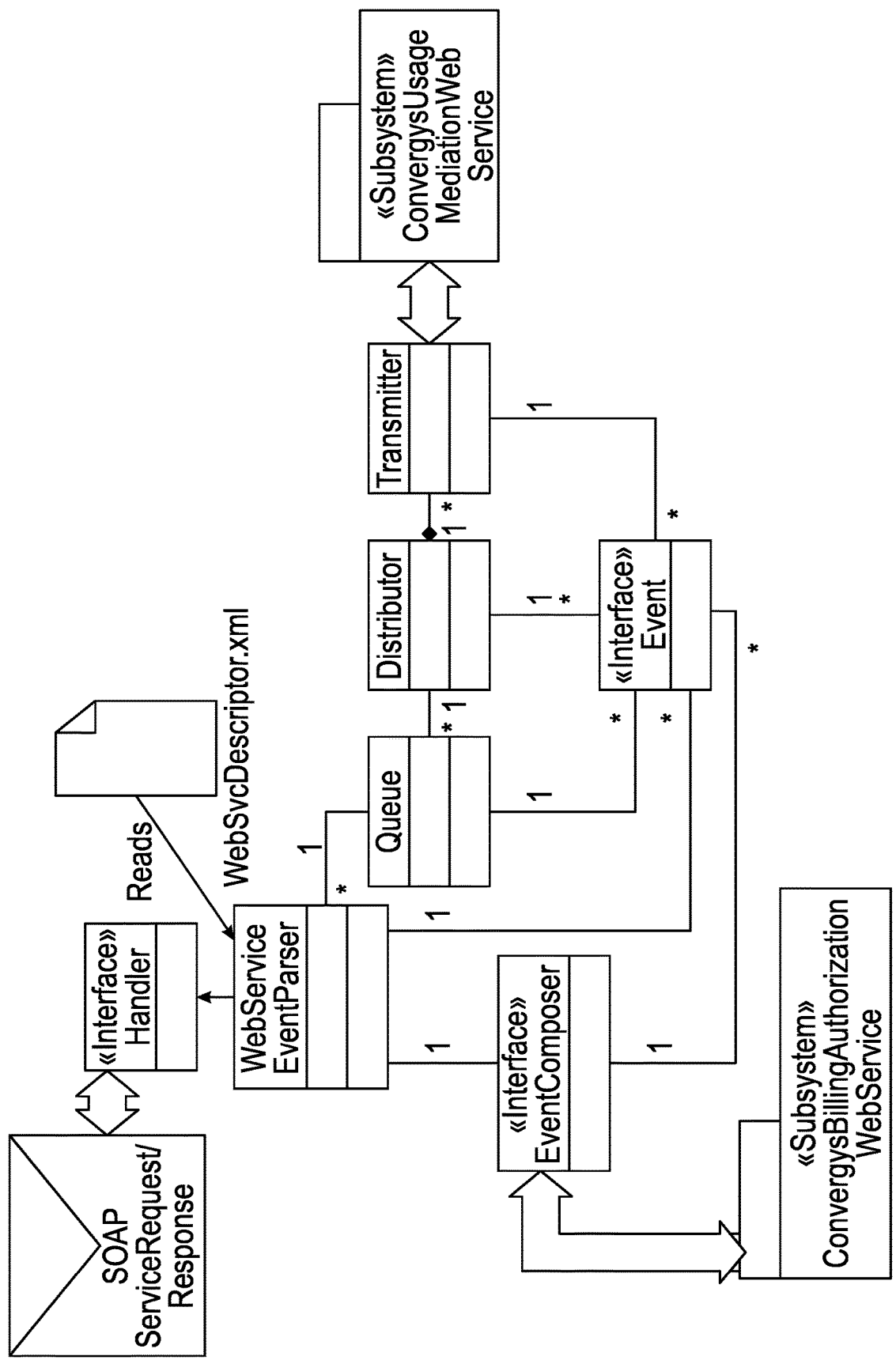
FIG. 25 illustrates one possible diagram of core classes and collaborators in WSUAF.

A distributor is used to dequeue events from the system queue and dispatch the events to registered transmitters. A distributor has a publish and subscribe relationship between itself and transmitters. Transmitters subscribe to event types that they may wish to receive with the distributor. Referring to FIG. 22, when a distributor pulls an event from the queue it dispatches the event to all subscribed transmitters.

A distributor runs on a thread that is a separate thread from the event parser and composer. A Distributor can run in the same address space as the event parser, composer and queue or in a separate address space. The distributor has a dependency on the system queue, so in whatever address space a distributor runs it must have access to the system event queue.

Interface

This is an abstraction for creating distributors. The type of distributor used in a runtime environment may be specified in the wsdk.xml configuration file, which may be the configuration file that may be used to configure the configurable properties of the WSUAF.

```
public interface Distributor extends Runnable {
    /**
     * Subscribes a transmitter to receive events. The transmitter's
     * <code>publish<code> interface is called whenever the
     * <code>Distributor</code> pulls an event from the pool that
    matches
     * a <code>Transmitter's<code> subscribed event type.
     *
     * @param transmitter The transmitter whose
    <code>publish<code> interface will
     * be invoked.
     * @param eventTypes Call the transmitter's
    <code>publish<code> interface
     * whenever one of these event types are to be distributed.
     * @throws EventTypeNotFoundException When an event type is
    not found.
     */
    public void subscribe(Transmitter transmitter, Class [ ] eventTypes);
    /**
     * Subscribes a transmitter to receive events. The transmitter's
     * <code>publish<code> interface is called whenever the
     * <code>Distributor<code> pulls an event from the pool that
    matches
     * a <code>Transmitter's<code> subscribed event type.
     *
     * @param transmitter The transmitter whose
    <code>publish<code> interface will
     * be invoked.
     * @param eventClassNames An array of event class names
     * @throws EventTypeNotFoundException When an event type is
    not found.
     */
public void subscribe(Transmitter transmitter, String [ ]
eventClassNames) throws EventTypeNotFoundException;
    /**
     * Unsubscribe this transmitter from the distributor.
     * @param transmitter The transmitter that no longer wishes to
    receive events.
     */
    public void unsubscribe(Transmitter transmitter);}
```

Standard Implementations

SimpleDistributor implements the publish and subscribe interactions between itself and the transmitters. It runs on a separate thread in the same address space as the event parser and composer.

Transmitters

Transmitters may be used to send web service events to other systems. A transmitter subscribes to the type of events it wishes to receive. A transmitter subscribes with the system distributor. There may be one or more transmitters per application; this may be configurable in the wsdk.xml configuration file.

Since transmitters may be responsible for sending events onto other systems it may be the transmitters responsibility to ensure that the events may be forwarded. If the event cannot be forwarded, then it may be the transmitters responsibility to ensure the a recovery process may be followed.

Interface

The transmitter interface defines an abstraction for receiving events. The system can support many different types of transmitters simultaneously.

```
public interface Transmitter {
    /**
     * This method is called by distributors to pass on events to
  transmitters.
     *
     * @param event An event that is to be fowarded to event
  collating and analyzing
     * systems.
     */
public void publish(Event event);}
```

Standard Implementations

The UsageMediationTransmitter handles events that support the Event interface. When the UsageMediationTransmitter receives an event it serializes the event by invoking the toEvent method on the event and then forwarding the result of the serialization via a web service call to the usage acquisition gateway.

WSDK Configuration File

This file contains the configuration to create the event propagation framework and to configure the WSUAF runtime. It may be used to identify the implementation of the queues, transmitters, distributors and event types that may be utilized by the WSUAF.

```
<?xml version="1.0" encoding="UTF-8" ?>
<!ELEMENT param-value ( #PCDATA ) >
<!ELEMENT event EMPTY >
<!ATTLIST event name CDATA #REQUIRED >
<!ATTLIST event class NMTOKEN #REQUIRED >
<!ELEMENT distributors ( distributor ) >
<!ELEMENT transmitter ( init-param*, events ) >
<!ATTLIST transmitter name NMTOKEN #REQUIRED >
<!ATTLIST transmitter class NMTOKEN #REQUIRED >
<!ELEMENT queues ( queue ) >
<!ELEMENT distributor ( init-param* ) >
<!ATTLIST distributor name NMTOKEN #REQUIRED >
<!ATTLIST distributor class NMTOKEN #REQUIRED >
<!ELEMENT queue ( init-param* ) >
<!ATTLIST queue name NMTOKEN #REQUIRED >
<!ATTLIST queue class NMTOKEN #REQUIRED >
<!ELEMENT init-param ( param-name, param-value ) >
<!ELEMENT transmitters ( transmitter ) >
<!ELEMENT param-name ( #PCDATA ) >
<!ELEMENT wsdk ( queues, distributors, transmitters ) >
<!ELEMENT events ( event+ ) >
```

The foregoing may be considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A method for billing for web services comprising the steps of:
creating a descriptor file designating an identified web service and a pre-defined element to be extracted from a web service network communication for the identified web service as the web service network communication is transmitted to or from a web service provider, the pre-defined element including information corresponding to the identified web service and used for rating or authorization and further used to create an event record to be used by a billing system;
storing said descriptor file in a tangible computer readable medium;
monitoring, by a stack handler resident on a computer of one of the web service provider or a service requestor, web service network communications of the computer for communications between the service requestor and the web service provider for a web service network communication for the identified web service;
determining, by the stack handler, that the web service network communication between the service requestor and the service provider requires rating or authorization based on the descriptor file and the identified web service of the web service network communication;
parsing, by the stack handler, the web service network communication for said predefined element in said descriptor file for the identified web service responsive to determining that the web service network communication requires rating or authorization;
sending, from the stack handler, said pre-defined element to a set of programmed instructions to create said event record, wherein the set of programmed instructions is configured to copy the pre-defined element from the web service network communication into the event record; and
electronically transmitting said event record to said billing system for further processing;
wherein the stack handler configured to monitor for said predefined element in said descriptor file is located at an entity taken from the list of entities consisting of:
a) the service requestor; or
b) the service provider;
wherein the web service network communication continues to the service provider if the web service network communication between the service requestor and the service provider does not require rating or authorization.

2. The computerized method of claim 1 further comprising:
transforming said pre-defined element according to a set of instructions in said descriptor file before transmitting said event record to the billing system.

3. The computerized method of claim 1 wherein said web service network communication comprises a request for the identified web service and a response to said request wherein said request comprises a start time and said response comprises an end time and further comprising the steps of:
creating a first event record comprising said start time;
sending said first event record to said billing system;
queuing said first event record in said billing system;
creating a second event record comprising said end time;
sending said second event record to said billing system;
matching said first event record with said second event record;
calculating a charge for said identified web service based on said start time and said end time;
returning said charge to said service provider.

4. The computerized method of claim 1 wherein said billing system comprises programmed billing instructions coded to cause the billing system to determine whether a web service transaction may be performed.

5. The computerized method of claim 4 wherein said programmed billing instructions are configured to cause the billing system to determine if said service requestor is permitted to access said web service transaction.

6. The computerized method of claim 5 wherein said billing system returns a response to said web service provider indicating whether said web service transaction should proceed.

7. The computerized method of claim 4 wherein said programmed billing instructions are configured to cause the billing system to determine whether said service requestor is solvent to purchase said web service transaction.

8. The computerized method of claim 7 wherein said programmed billing instructions are configured to cause the billing system to return a response to a set of application code associated with said web service provider indicating whether said web service transaction should proceed.

9. The computerized method of claim 7 wherein said programmed billing instructions are configured to cause the billing system to return a response to said web service provider indicating a quantity for said web service transaction to proceed.

10. The computerized method of claim 1 wherein said web service network communication comprises a SOAP message stream;
wherein the service requestor accesses the service provider on a direct peer-to-peer basis;
and wherein the handler is located at the service provider.

11. The computerized method of claim 10 wherein said SOAP message stream comprises a set of data including quality of service information, authorization key fields, version numbers, encrypted account information, and start/stop time.

12. The computerized method of claim 10 wherein said billing system uses said pre-defined element in said SOAP message stream to support at least one pre-defined billing plan.

13. The computerized method of claim 12 wherein said pre-defined billing plans is chosen from a list consisting of subscriptions, bundled plans, time-based usage plans, re-occurring charges, one-time charges, discount plans based on usage, discount plans based on time-of-day, discount plans based on customer loyalty, discount plans based on family/organization relationships, tiered plans, location dependent pricing, or combinations thereof.

14. A non-transitory tangible computer-readable medium having computer executable instructions operable to configure a computer to perform a method comprising:
a) receiving a descriptor file, wherein the descriptor file designates at least one pre-defined element to be extracted from a web service network communication for an identified web service as the web service network communication is transmitted to or from a web service provider, the pre-defined element including information corresponding to the identified web service and used for rating or authorization and further used to create an event record to be used by a billing system;
b) monitoring web service network communications of the computer using a stack handler for a web services stack for the identified web service in the descriptor file, wherein the monitoring comprises determining that the web service network communication requires rating or authorization based on the descriptor file and the identified web service of the web service network communication, wherein the web service network communication continues to a destination of the web service network communication if the web service network communication does not require rating or authorization;
(c) parsing the web service network communication for the at least one pre-defined element from the descriptor file if the web service network communication requires rating or authorization;
d) copying the at least one pre-defined element from said network communication into said event record responsive to determining that the web service network communication requires rating or authorization; and
e) sending said event record to said billing system for further processing.

15. The non-transitory computer readable medium of claim 14, wherein:
a) the monitored web service network communications are between a service requestor and a service provider;
b) the computer readable medium is located at the service provider; and
c) the web service network communication comprises a communication where the service requestor accesses the service provider on a direct peer-to-peer basis.

16. The non-transitory computer readable medium of claim 14, wherein the instructions are further operable to configure the computer to receive a response from the billing system indicating whether a web service transaction corresponding to the web service network communication should proceed.

17. A machine comprising:
a) a tangible computer readable medium, wherein the tangible computer readable medium stores a descriptor file designating one or more pre-defined elements to be extracted from a web service network communication for an identified web service as the web service network communication is transmitted to or from a web service provider, the pre-defined element including information corresponding to the identified web service and used for rating or authorization and further used to create an event record to be used by a billing system;
b) a handler configured to monitor the web service network communication for said one or more pre-defined elements designated by the descriptor file, wherein the monitoring comprises determining the web service network communication requires rating or authorization based on the descriptor file and the identified web service of the web service network communication, wherein the web service network communication continues to a destination of the web service network communication if the web service network communication does not require rating or authorization, wherein the handler parses the web service communication for the one or more pre-defined elements designated by the descriptor file if the web service network communication does require rating or authorization; and
c) an event composer, wherein the event composer is in communication with the handler, said event composer configured to copy said one or more pre-defined elements from said web service network communication into said event record and to send the event record to said billing system for further processing.

18. The machine of claim 17, wherein:
a) the descriptor file stored on the tangible computer readable medium comprises a means for designating one or more pre-defined elements; and
b) the further processing comprises determining whether a transaction corresponding to the web service message stream should proceed.

19. The non-transitory computer readable medium of claim 14, wherein said web service network communication comprises a SOAP message stream.

20. The machine of claim 17, wherein said web service network communication comprises a SOAP message stream.

* * * * *